United States Patent
Sasaki et al.

(10) Patent No.: US 6,884,730 B2
(45) Date of Patent: Apr. 26, 2005

(54) METHOD OF ETCHING A FILM OF MAGNETIC MATERIAL AND METHOD OF MANUFACTURING A THIN-FILM MAGNETIC HEAD

(75) Inventors: Yoshitaka Sasaki, Milpitas, CA (US); Hironori Araki, Milpitas, CA (US); Takehiro Kamigama, Hong Kong (CN)

(73) Assignees: Headway Technologies, Inc., Milpitas, CA (US); SAE Magnetics (H.K.), Ltd., Hong Kong (CN)

( * ) Notice: Subject to any disclaimer, the term of this patent is extended or adjusted under 35 U.S.C. 154(b) by 230 days.

(21) Appl. No.: 10/186,428

(22) Filed: Jul. 2, 2002

(65) Prior Publication Data

US 2004/0004056 A1 Jan. 8, 2004

(51) Int. Cl.⁷ .............................................. H01L 21/302
(52) U.S. Cl. ....................... 438/706; 438/710; 438/714; 438/720; 216/67; 216/75
(58) Field of Search ................................. 438/706, 710, 438/712, 714, 720; 216/58, 66, 67, 75

(56) References Cited

U.S. PATENT DOCUMENTS

| | | | | |
|---|---|---|---|---|
| 4,439,294 A | * | 3/1984 | Bril et al. ............... | 204/192.35 |
| 5,607,599 A | * | 3/1997 | Ichihara et al. ............... | 216/22 |
| 5,966,800 A | * | 10/1999 | Huai et al. ............... | 29/603.13 |
| 6,043,959 A | * | 3/2000 | Crue et al. ................... | 360/317 |
| 6,259,583 B1 | | 7/2001 | Fontana, Jr. et al. | |
| 6,284,146 B1 | * | 9/2001 | Kim et al. ...................... | 216/6 |
| 6,723,252 B1 | * | 4/2004 | Hsiao et al. ................... | 216/22 |
| 2001/0055879 A1 | | 12/2001 | Sasaki | |

FOREIGN PATENT DOCUMENTS

| | | |
|---|---|---|
| JP | A 6-44528 | 2/1994 |
| JP | A 2001-344709 | 12/2001 |

\* cited by examiner

*Primary Examiner*—Lan Vinh
(74) *Attorney, Agent, or Firm*—Oliff & Berridge, PLC

(57) ABSTRACT

In a thin-film magnetic head, a top pole layer for defining the recording track width includes a first layer that touches a recording gap layer, and a second layer located on the first layer. The top pole layer is formed in the following manner. First, a magnetic layer is formed on the recording gap layer. Next, the second layer is formed on the magnetic layer by plating. Using the second layer as a mask, the magnetic layer is selectively etched by reactive ion etching to form the first layer. The reactive ion etching uses an etching gas that contains a halogen type gas and a carbon oxide type gas.

57 Claims, 33 Drawing Sheets

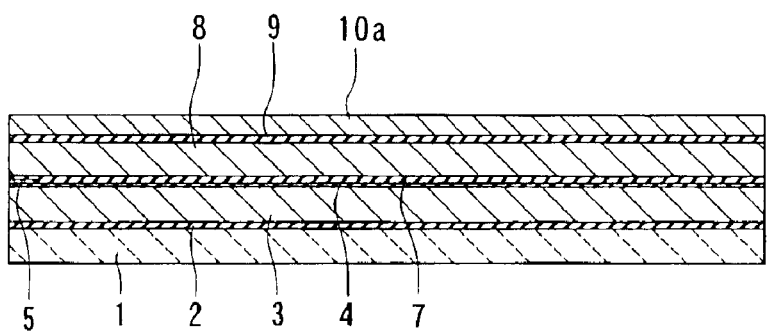
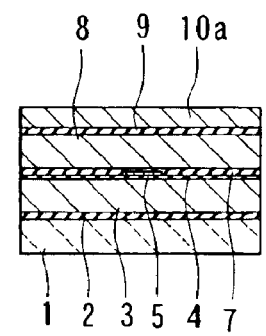
FIG. 1A　　　　　　　　　FIG. 1B
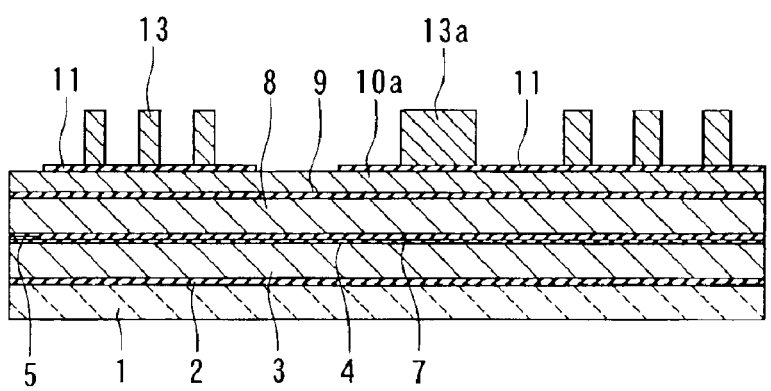
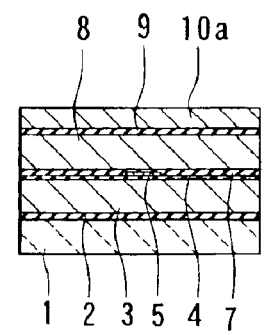
FIG. 2A　　　　　　　　　FIG. 2B

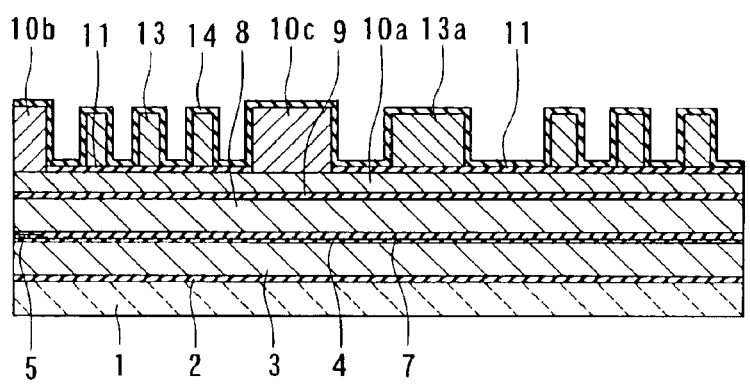 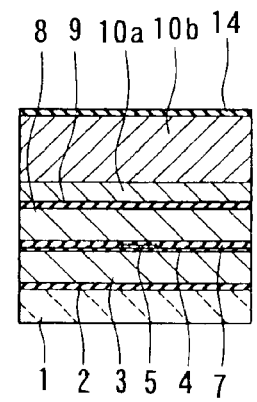
FIG. 3A  FIG. 3B
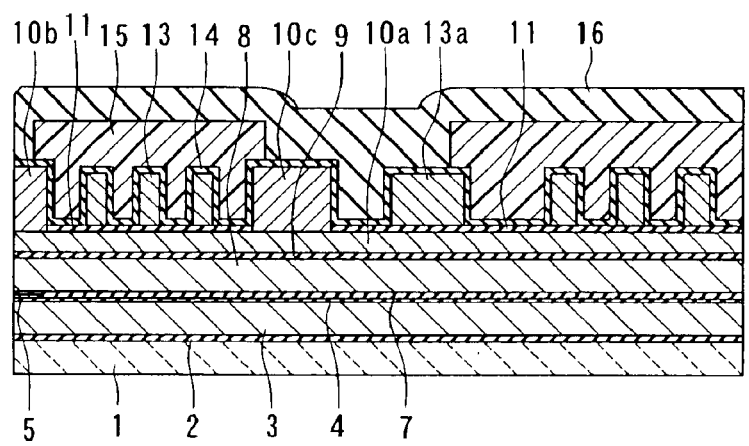 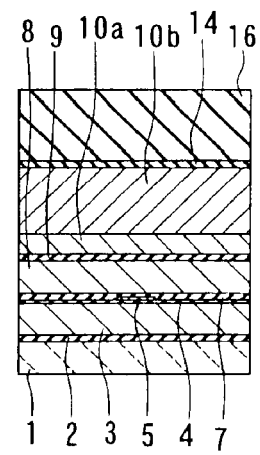
FIG. 4A  FIG. 4B

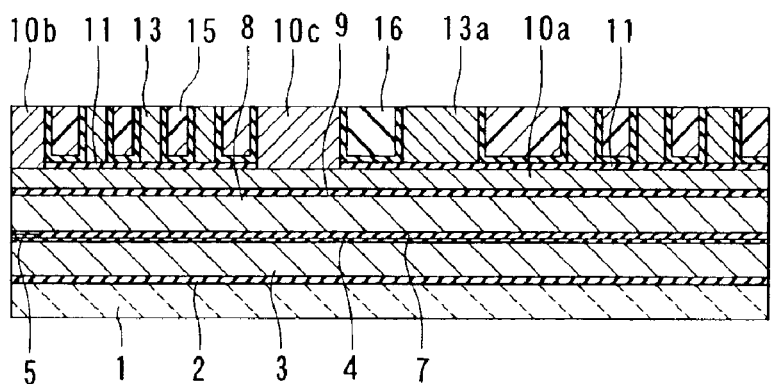 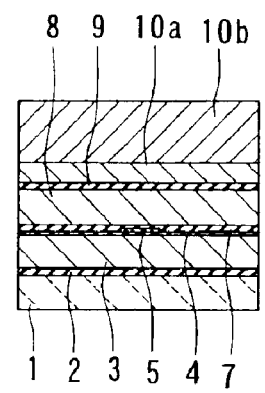
FIG. 5A    FIG. 5B
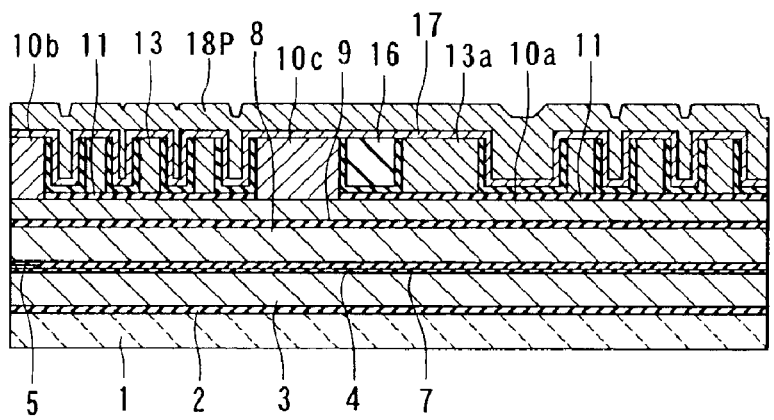 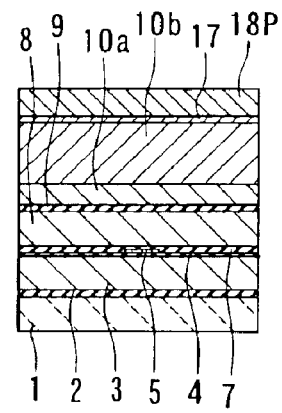
FIG. 6A    FIG. 6B

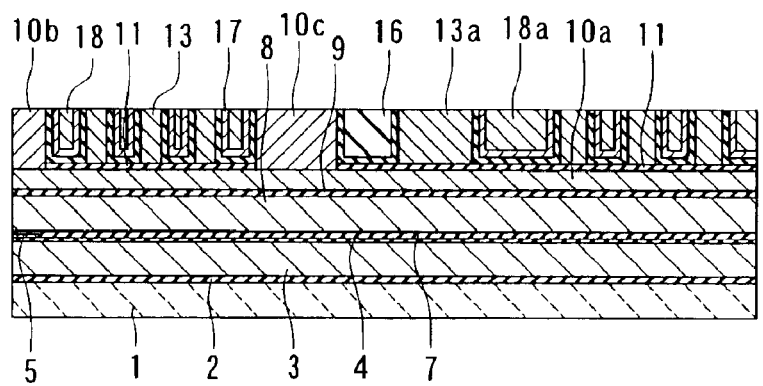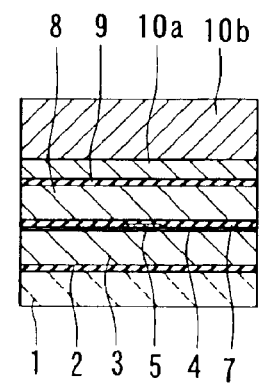
FIG. 7A　　　　　　　　　　FIG. 7B
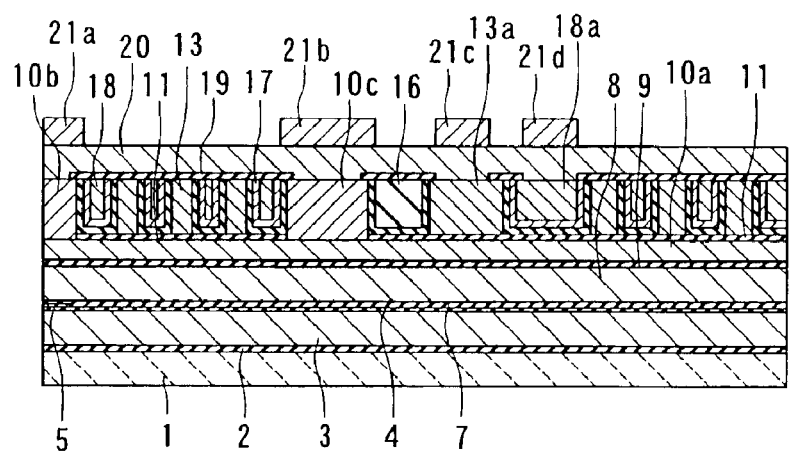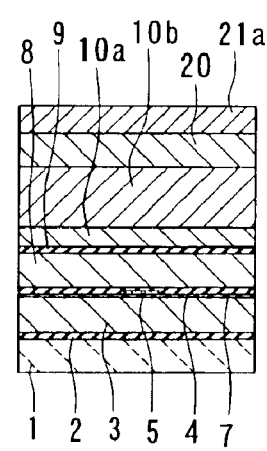
FIG. 8A　　　　　　　　　　FIG. 8B

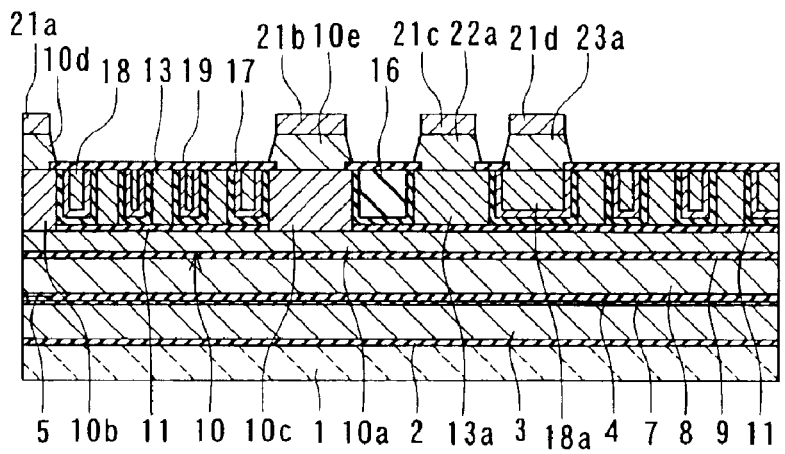 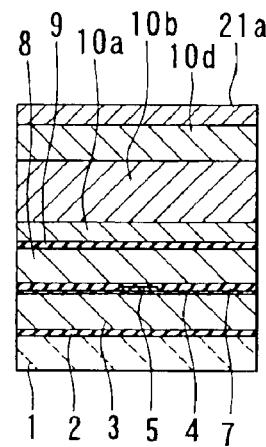
FIG. 9A  FIG. 9B
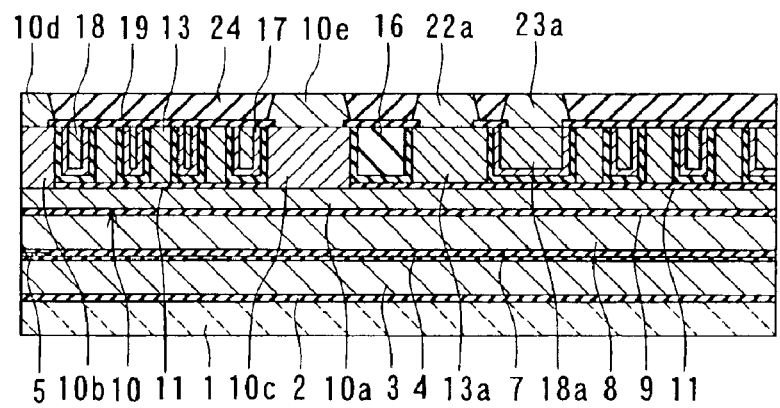 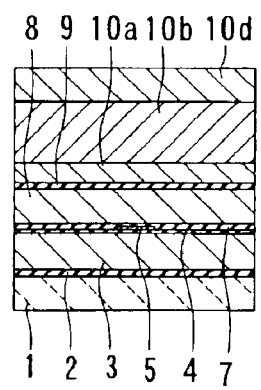
FIG. 10A  FIG. 10B

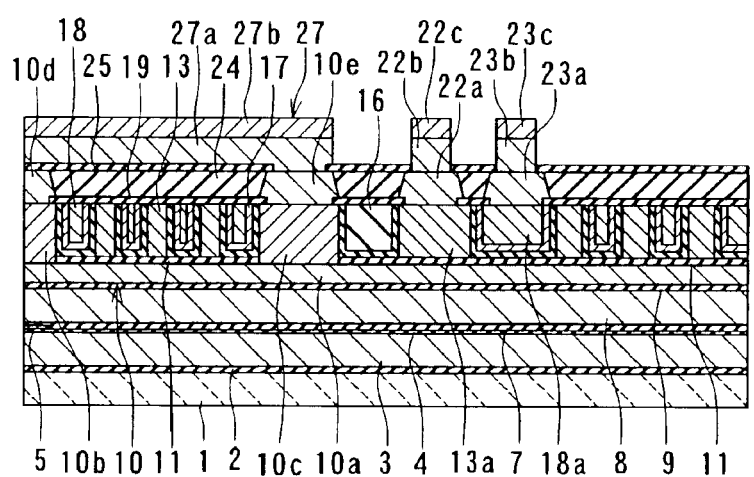
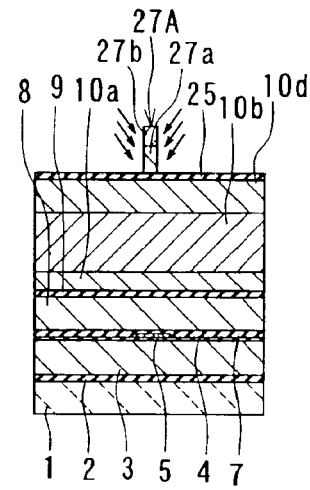
FIG. 13A        FIG. 13B
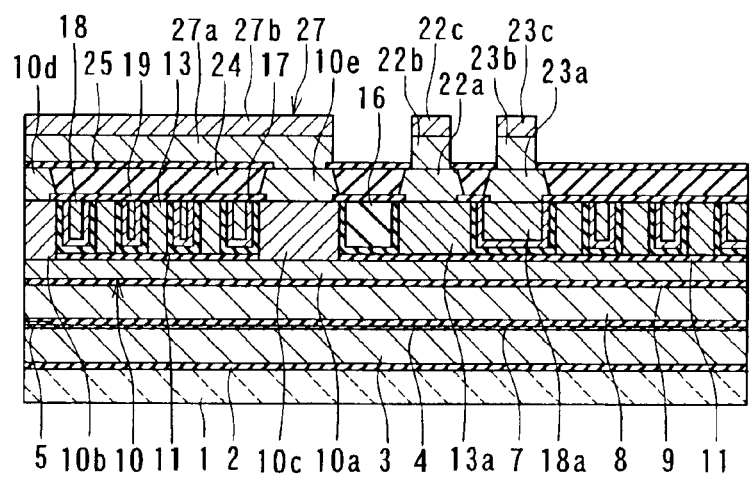
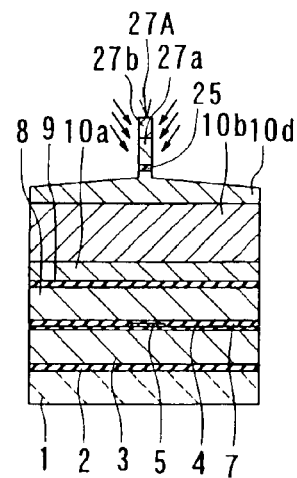
FIG. 14A        FIG. 14B

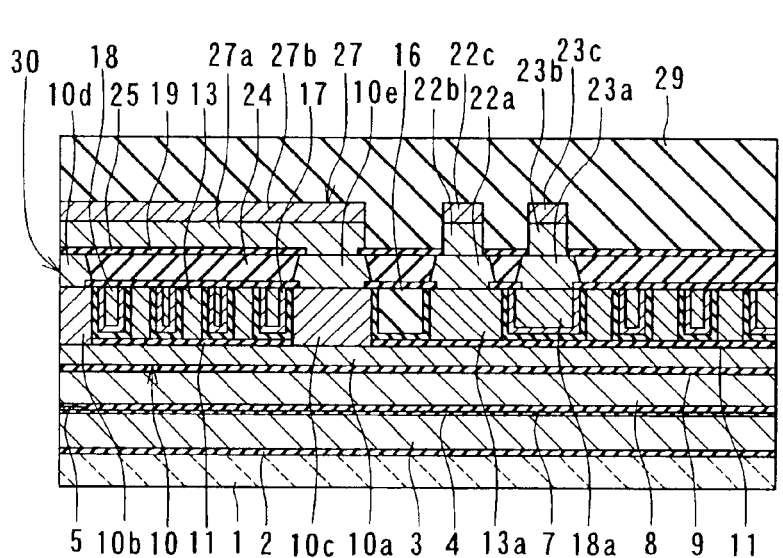
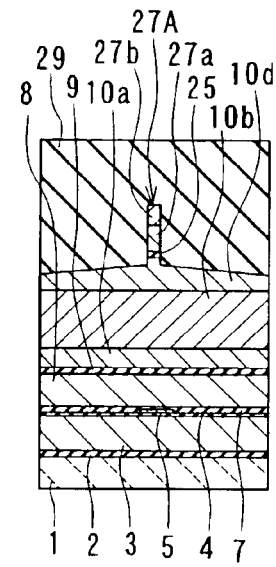
FIG. 15A  FIG. 15B
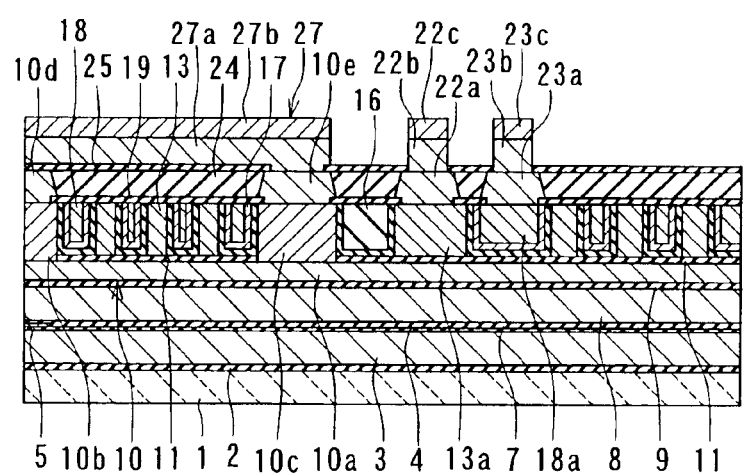
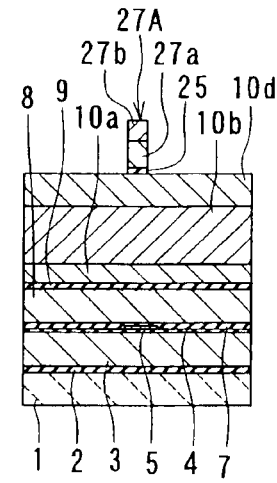
FIG. 16A  FIG. 16B

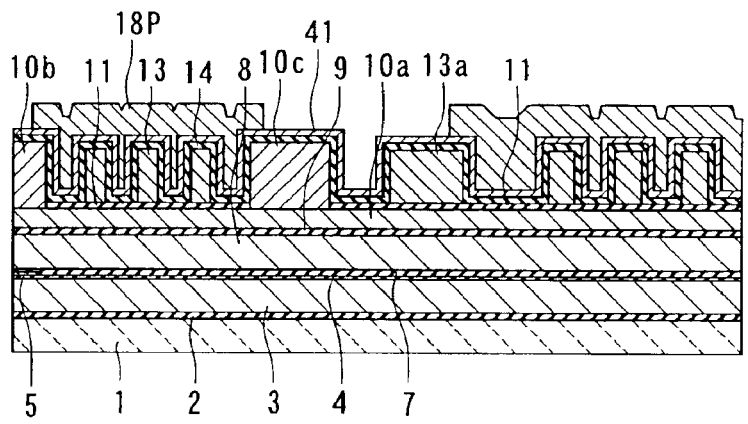 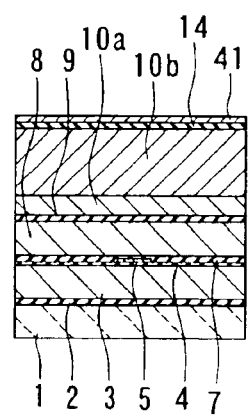
FIG. 23A  FIG. 23B
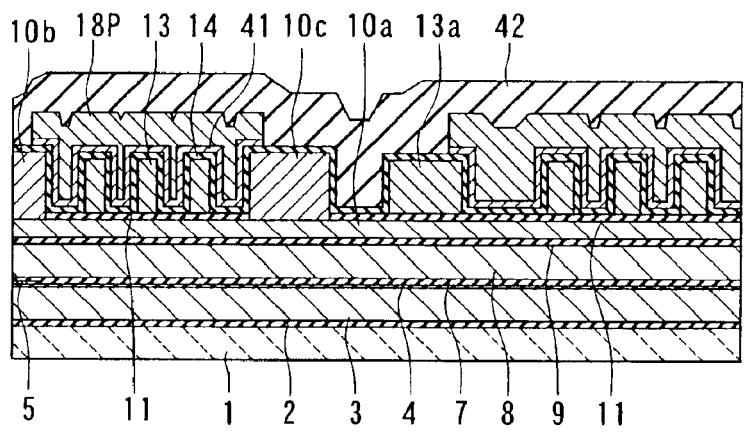 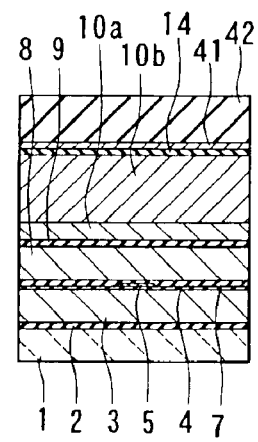
FIG. 24A  FIG. 24B

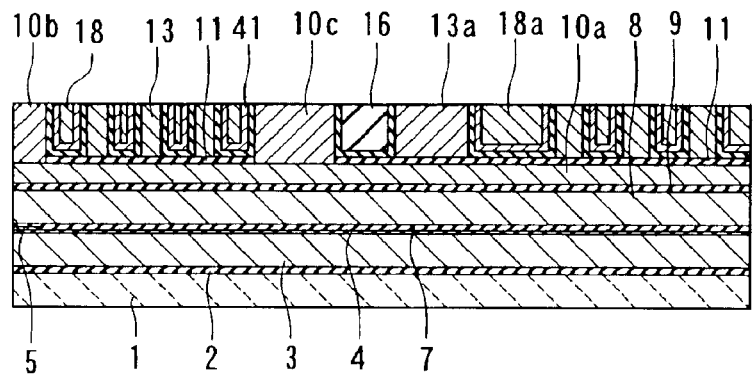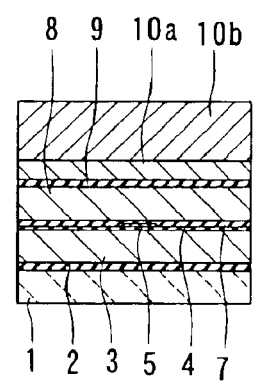
FIG. 25A  FIG. 25B
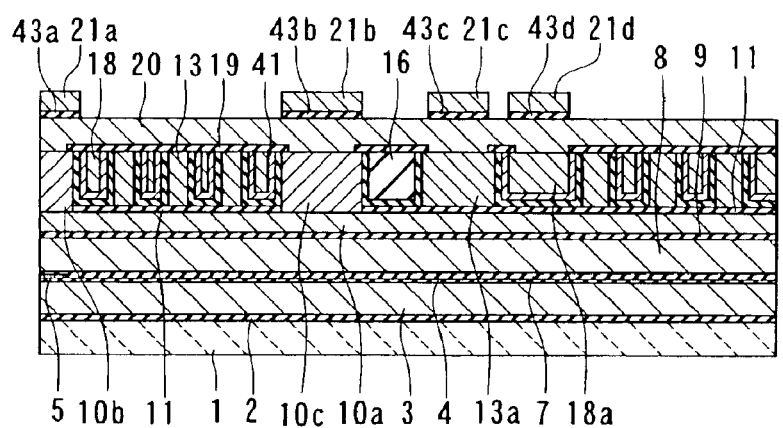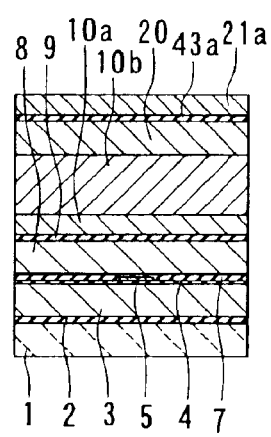
FIG. 26A  FIG. 26B

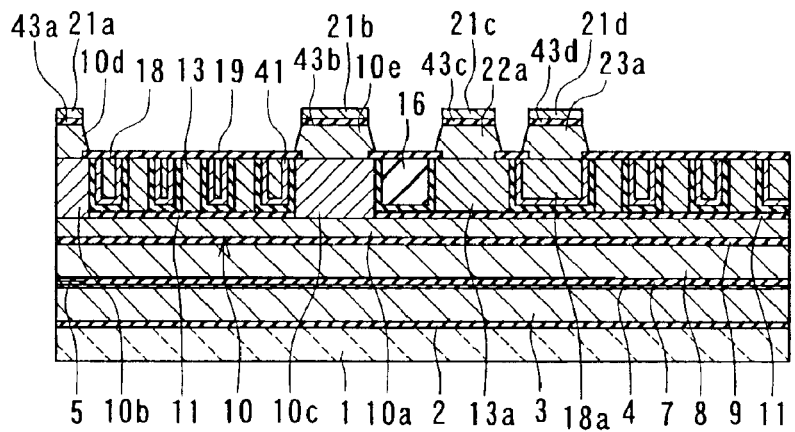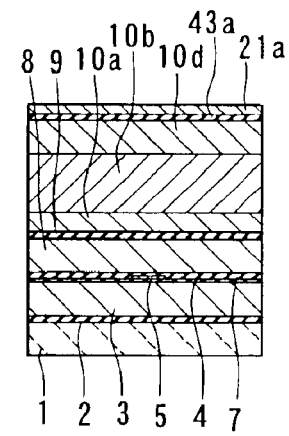
FIG. 27A  FIG. 27B
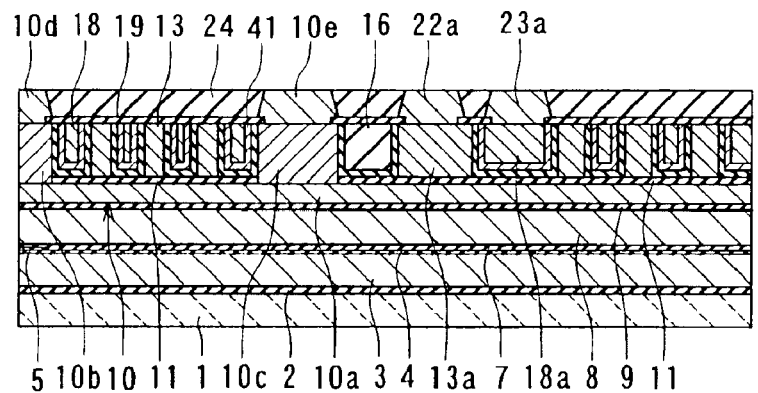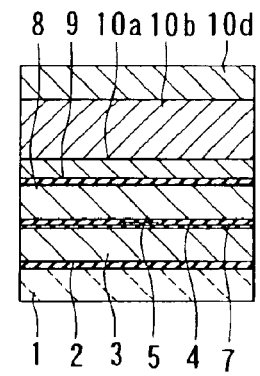
FIG. 28A  FIG. 28B

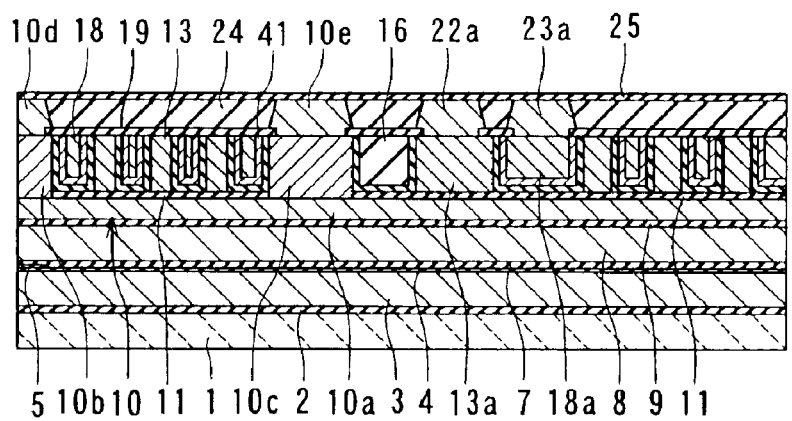
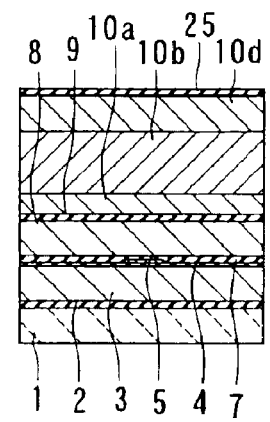
FIG. 29A
FIG. 29B
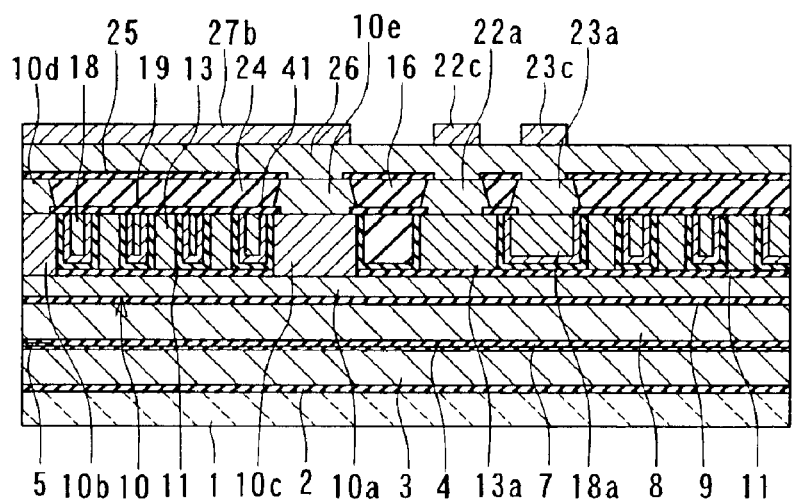
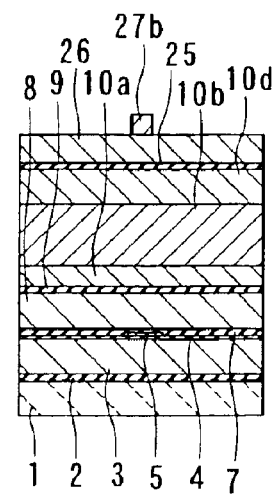
FIG. 30A
FIG. 30B

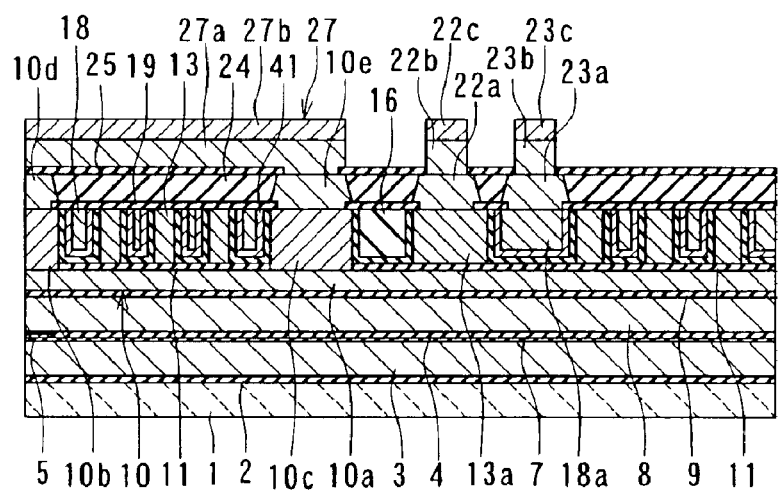
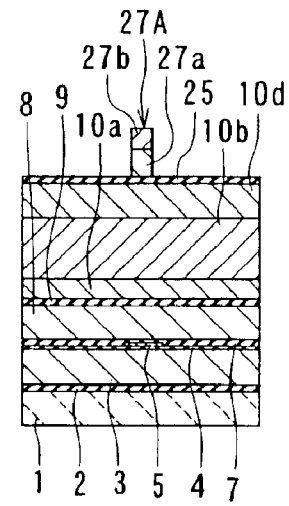
FIG. 31A  FIG. 31B
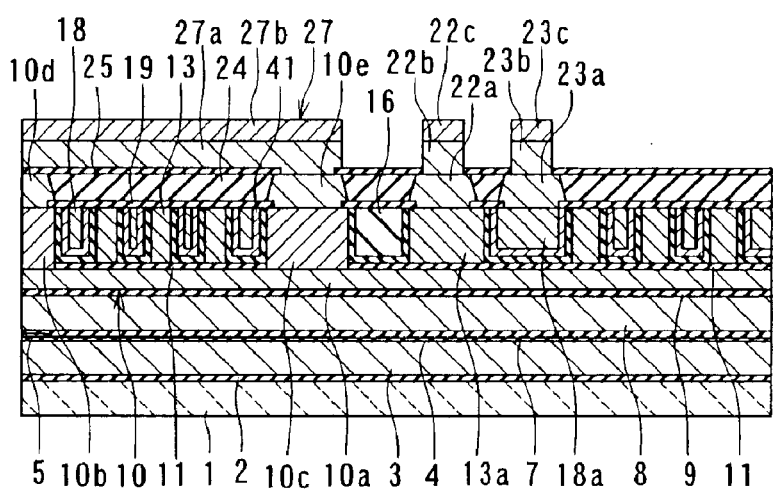
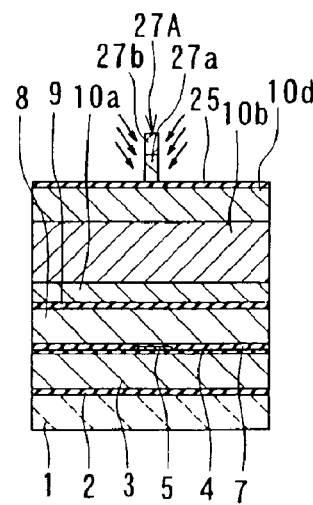
FIG. 32A  FIG. 32B

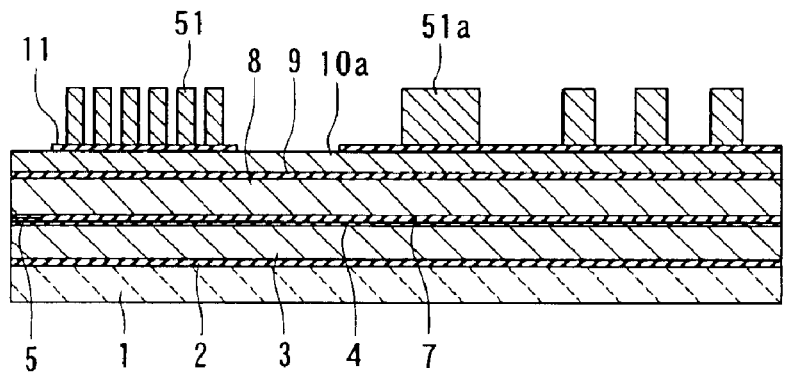 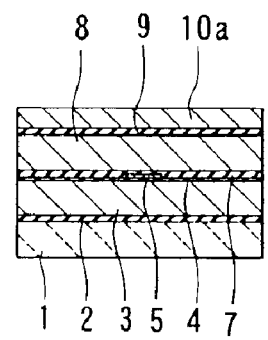
FIG. 35A  FIG. 35B
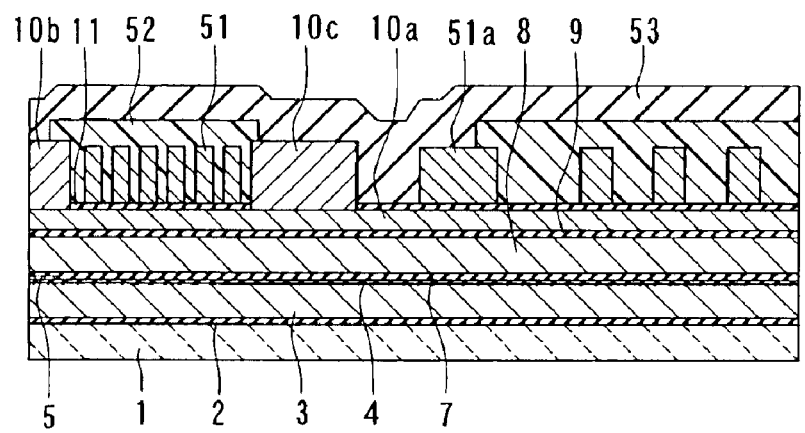 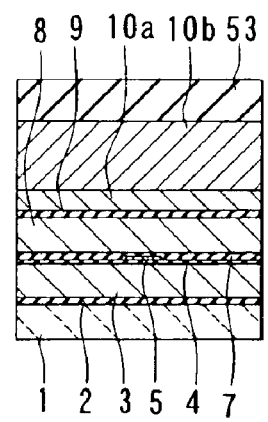
FIG. 36A  FIG. 36B

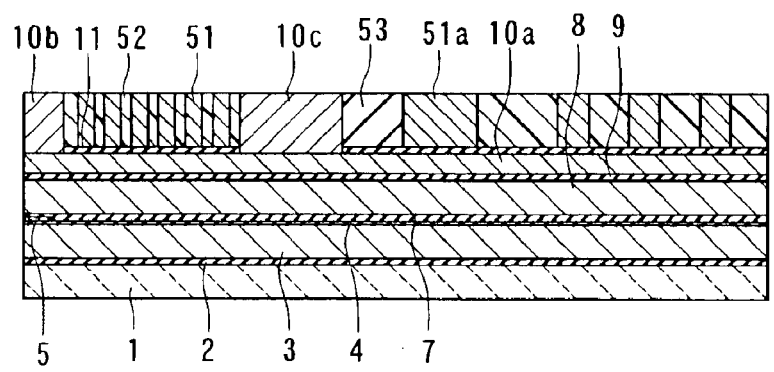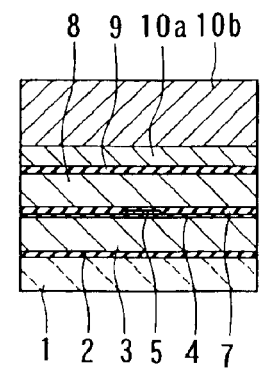
FIG. 37A          FIG. 37B
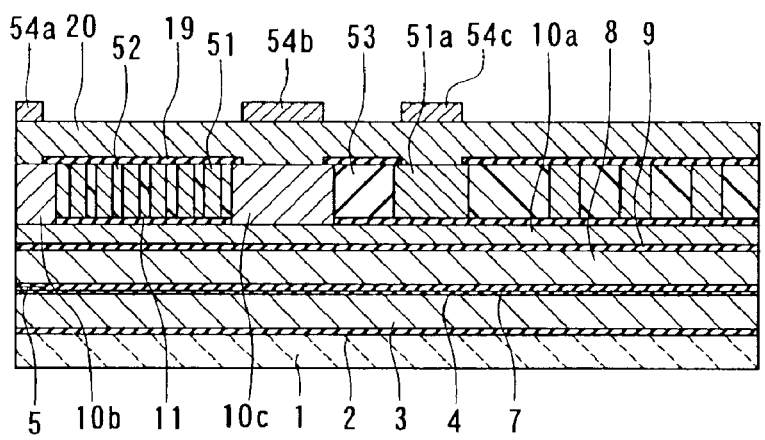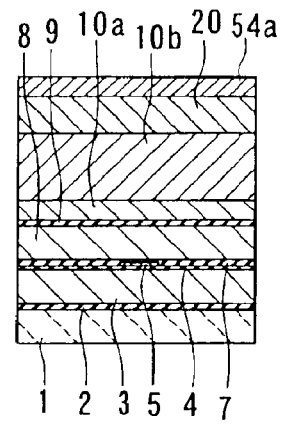
FIG. 38A          FIG. 38B

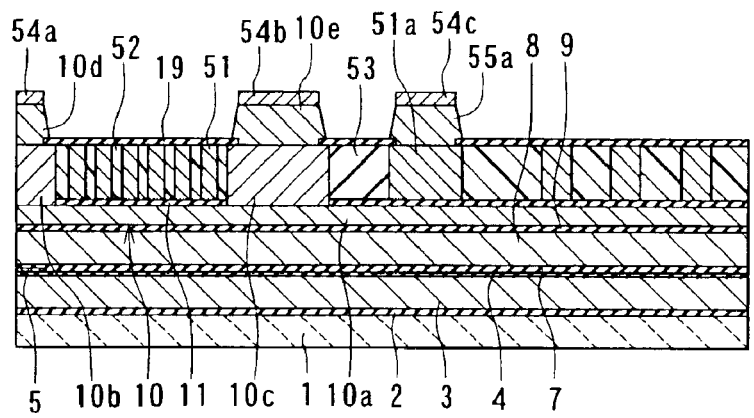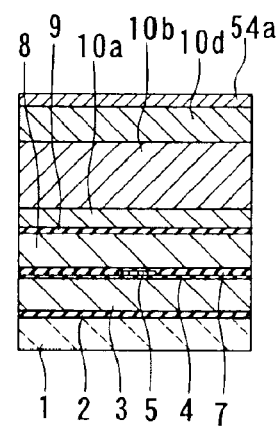
FIG. 39A        FIG. 39B
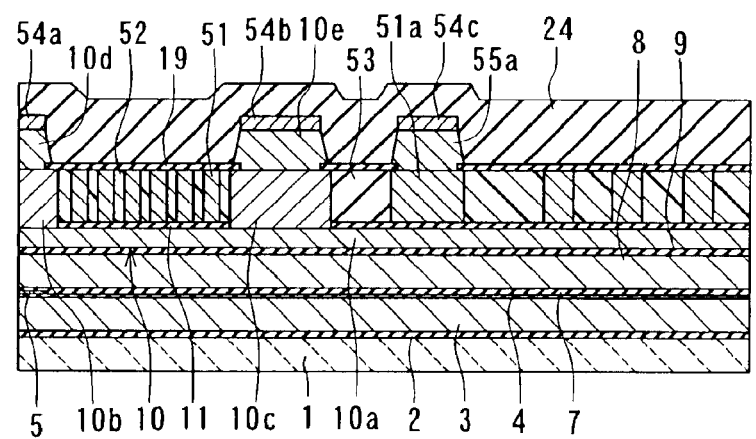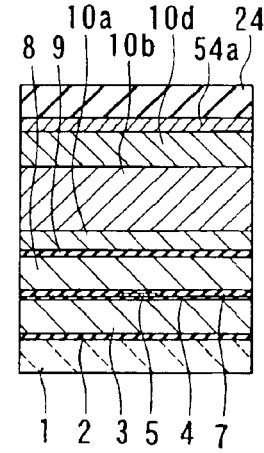
FIG. 40A        FIG. 40B

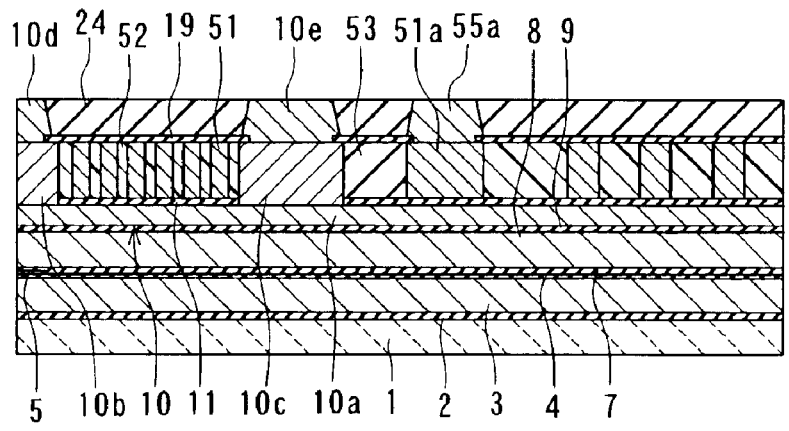 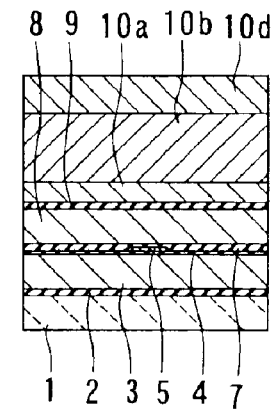
FIG. 41A   FIG. 41B
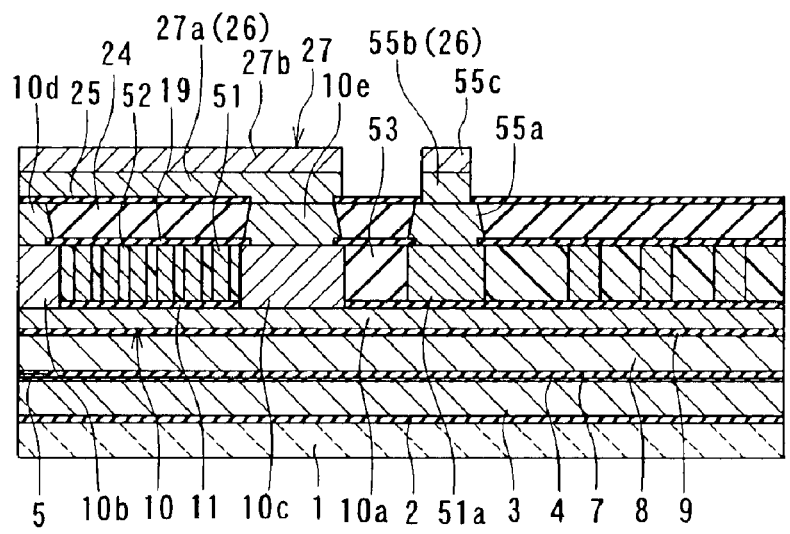 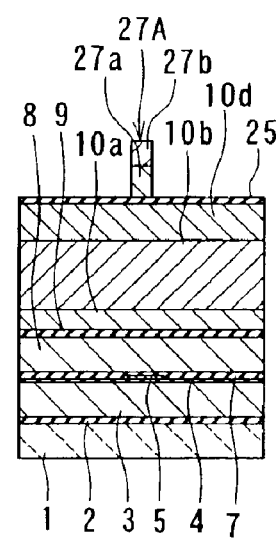
FIG. 42A   FIG. 42B

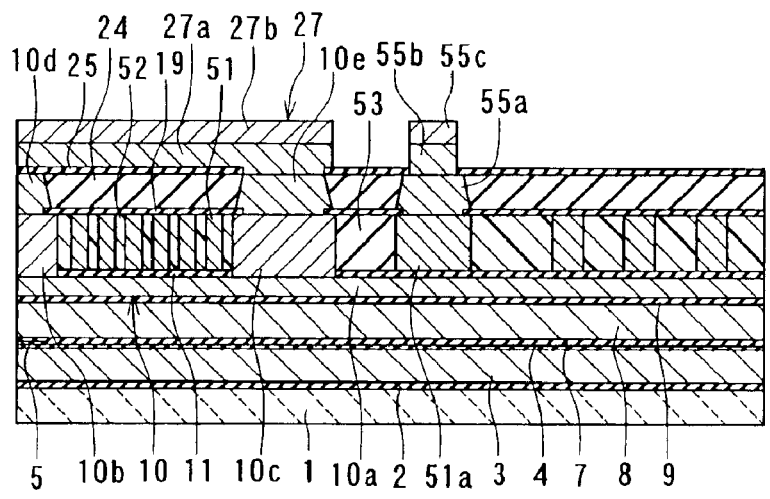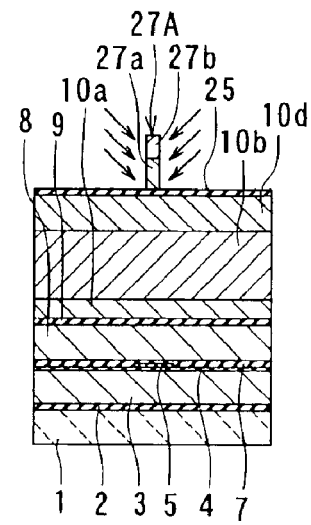
FIG. 43A    FIG. 43B
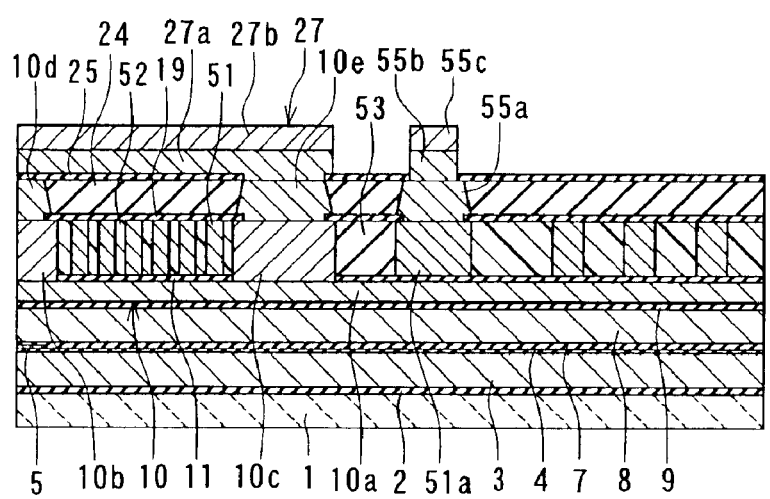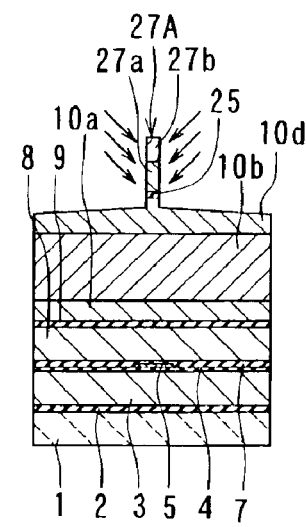
FIG. 44A    FIG. 44B

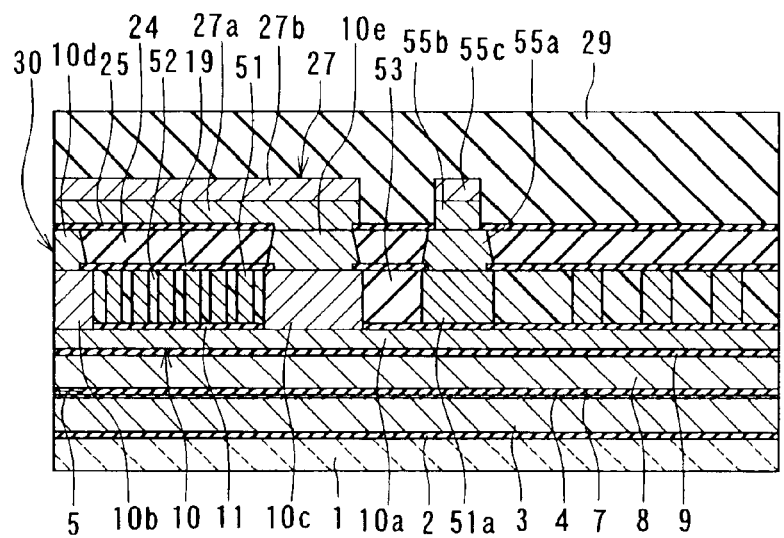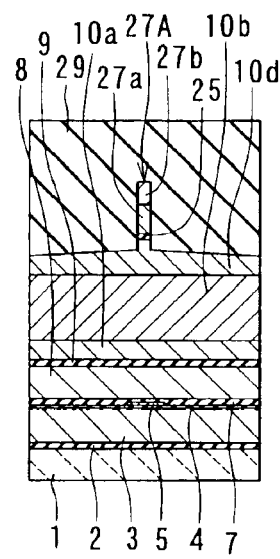
FIG. 45A  FIG. 45B
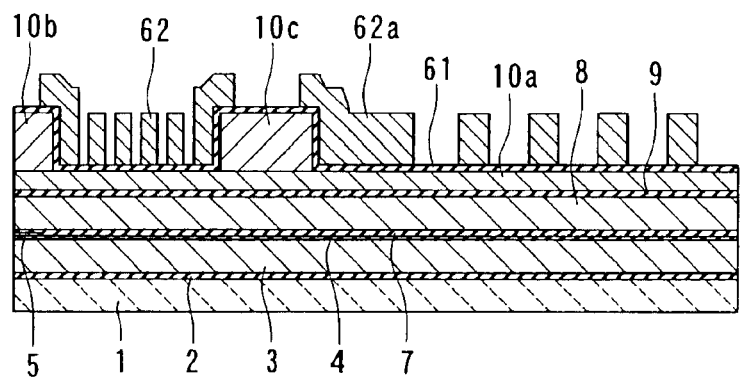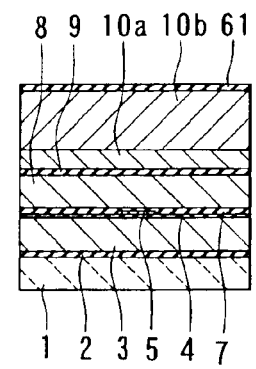
FIG. 46A  FIG. 46B

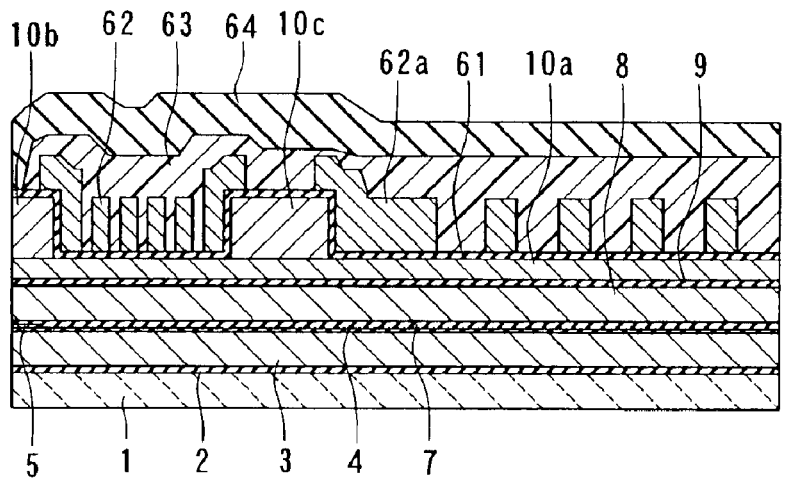
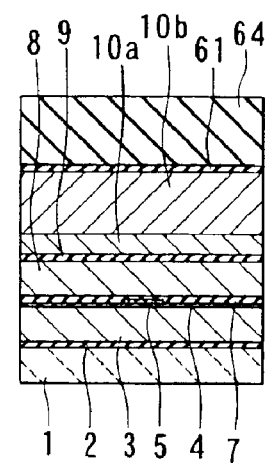
FIG. 47A
FIG. 47B
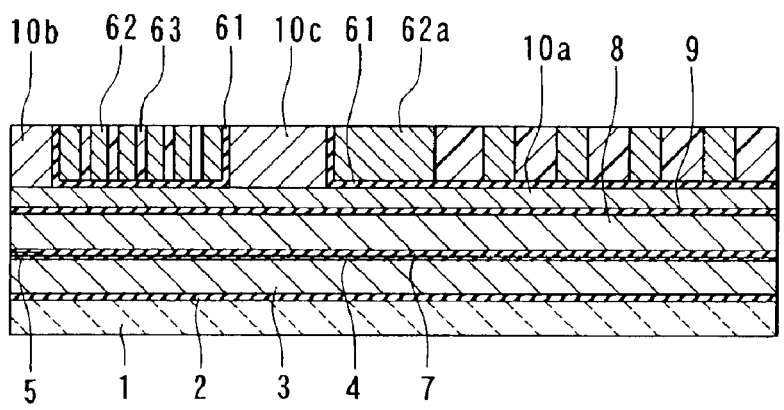
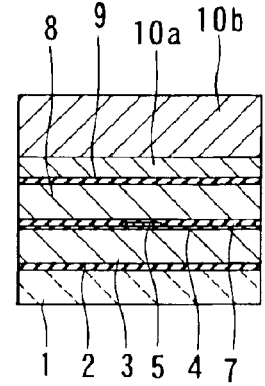
FIG. 48A
FIG. 48B

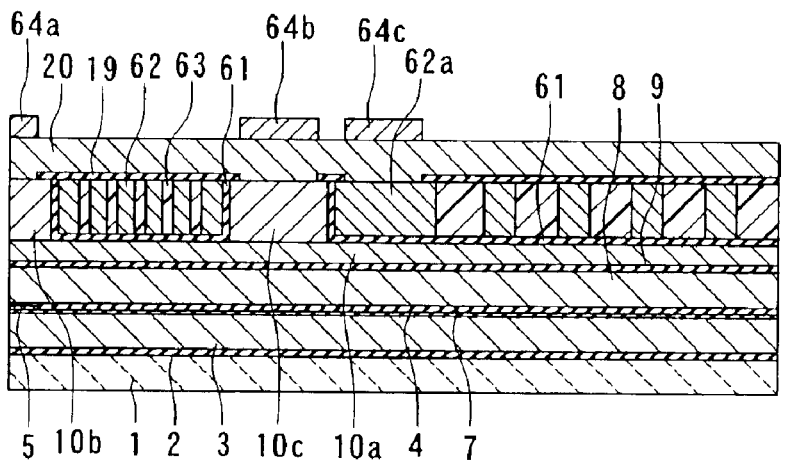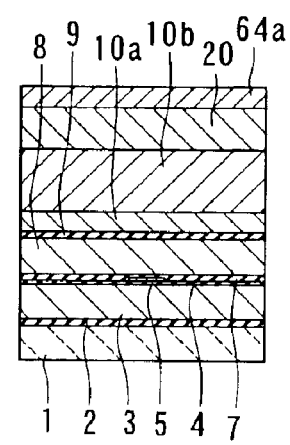
FIG. 49A  FIG. 49B
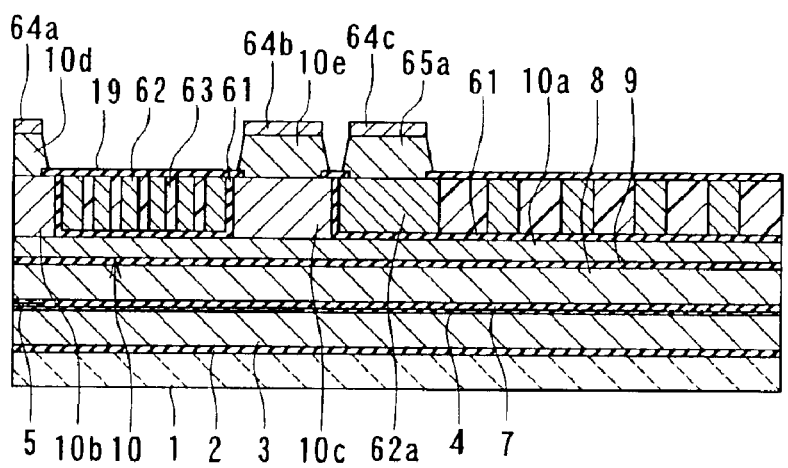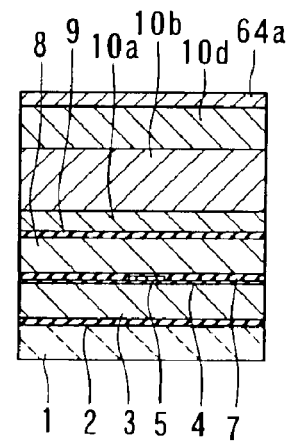
FIG. 50A  FIG. 50B

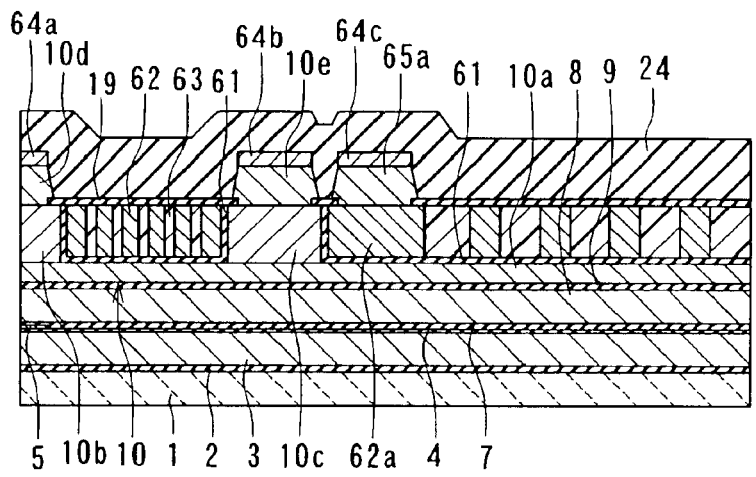 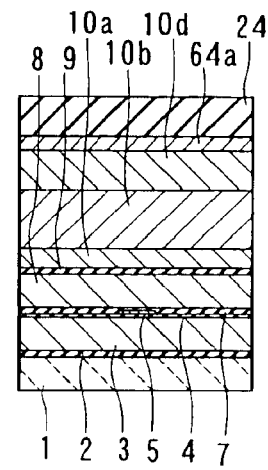
FIG. 51A  FIG. 51B
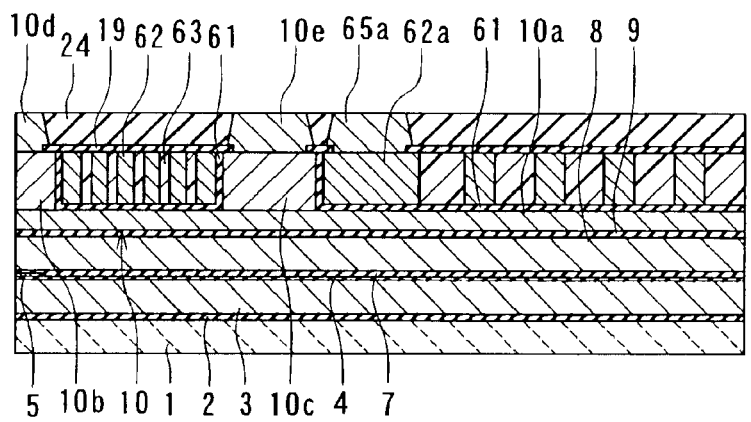 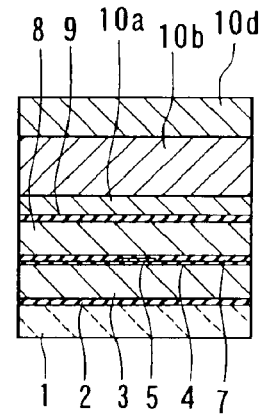
FIG. 52A  FIG. 52B

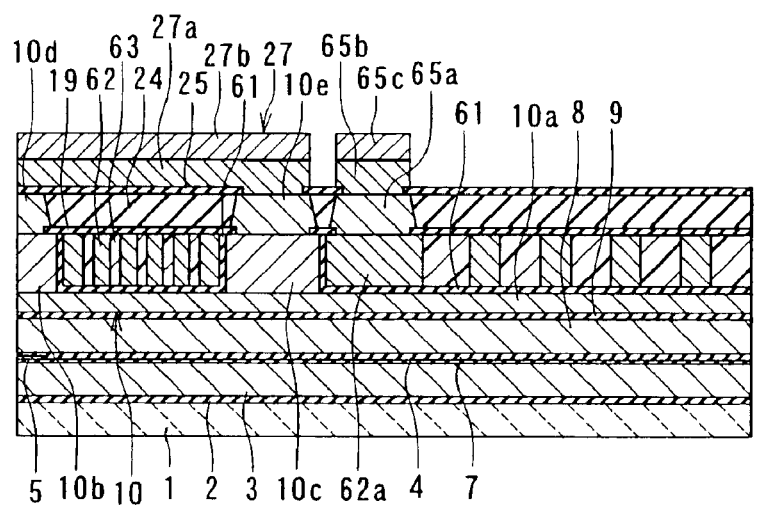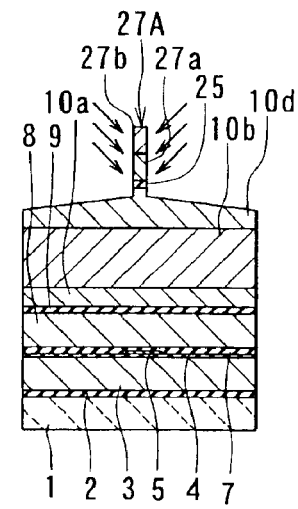
FIG. 55A  FIG. 55B
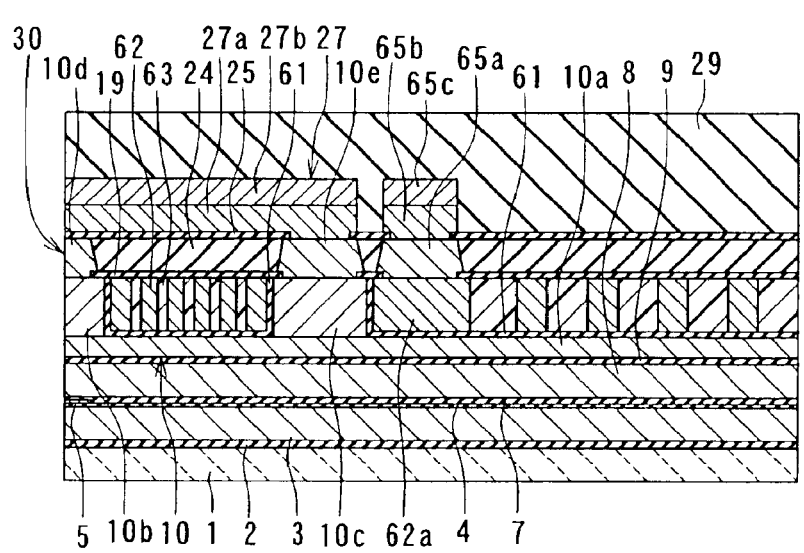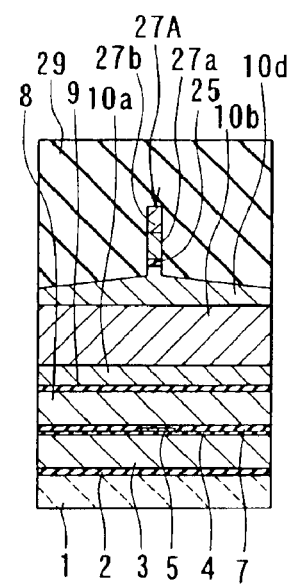
FIG. 56A  FIG. 56B

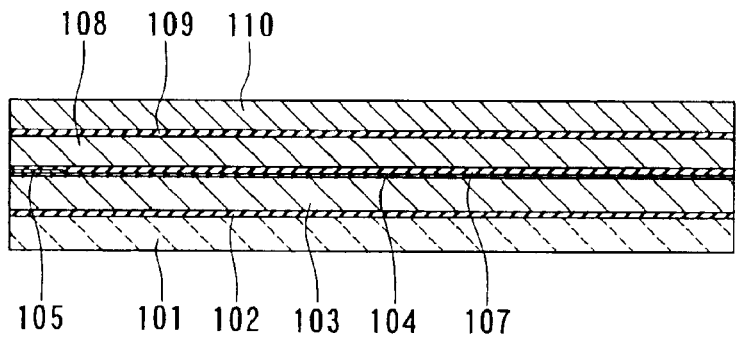 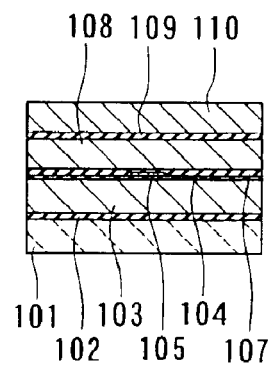
FIG. 57A
RELATED ART
FIG. 57B
RELATED ART
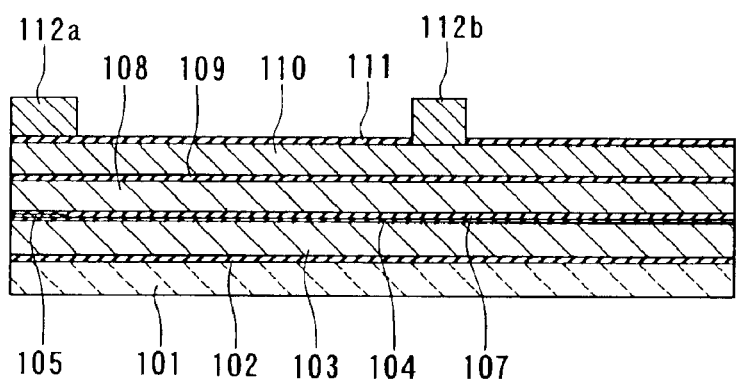 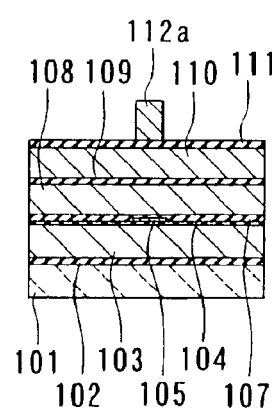
FIG. 58A
RELATED ART
FIG. 58B
RELATED ART

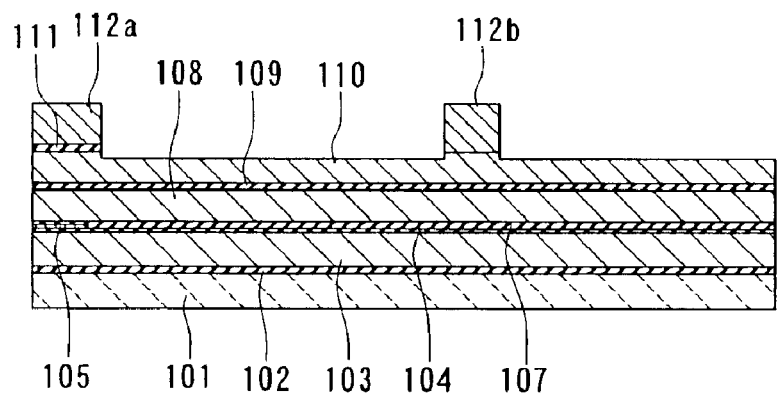
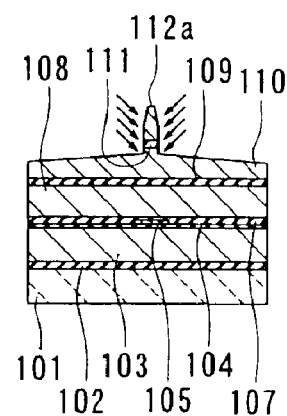
FIG. 59A
RELATED ART
FIG. 59B
RELATED ART
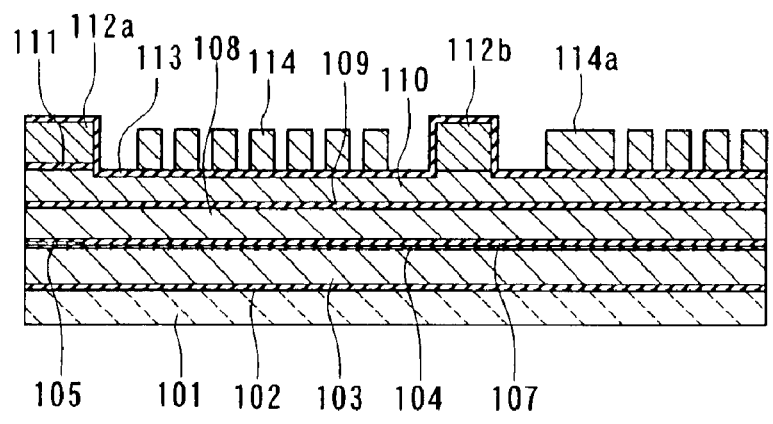
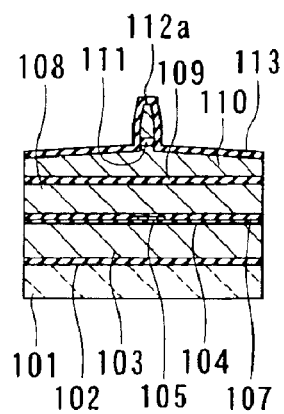
FIG. 60A
RELATED ART
FIG. 60B
RELATED ART

METHOD OF ETCHING A FILM OF MAGNETIC MATERIAL AND METHOD OF MANUFACTURING A THIN-FILM MAGNETIC HEAD

BACKGROUND OF THE INVENTION

1. Field of the Invention

The present invention relates to a method of etching a magnetic material film and a method of manufacturing a thin-film magnetic head that has at least an induction-type electromagnetic transducer.

2. Description of the Related Art

Recent years have seen significant improvements in the areal recording density of hard disk drives. In particular, areal recording densities of latest hard disk drives reach 80 to 120 Gbit/(inch)$^2$ and are even on a pace to exceed that level. Thin-film magnetic heads are required of improved performance accordingly.

Among the thin-film magnetic heads, widely used are composite thin-film magnetic heads made of a layered structure including a recording head having an induction-type electromagnetic transducer for writing and a reproducing head having a magnetoresistive element (that may be hereinafter called an MR element) for reading.

In general, a recording head incorporates: a medium facing surface (air bearing surface) that faces toward a recording medium; a bottom pole layer and a top pole layer that are magnetically coupled to each other and include magnetic pole portions opposed to each other and located in regions of the pole layers on a side of the medium facing surface; a recording gap layer provided between the magnetic pole portions of the top and bottom pole layers; and a thin-film coil at least part of which is disposed between the top and bottom pole layers and insulated from the top and bottom pole layers.

Higher track densities on a recording medium are essential to enhancing the recording density among the performances of a recording head. To achieve this, it is required to implement a recording head of a narrow track structure in which the track width, that is, the width of the two magnetic pole portions opposed to each other on a side of the medium facing surface, with the recording gap layer disposed in between, is reduced down to microns or the order of submicron. Semiconductor process techniques are utilized to achieve such a structure.

With decreasing track width, it becomes harder to generate a high-density magnetic flux between the two magnetic pole portions that are opposed to each other with the recording gap layer in between. On that account, it is desirable that the magnetic pole portions be made of a magnetic material having a higher saturation flux density.

Typical high saturation flux density materials include NiFe and CoNiFe which are formable into films by plating, and FeN, FeCo, and CoFeN which have still higher saturation flux densities and are formable into films by sputtering.

To form a magnetic layer including a magnetic pole portion using a high saturation flux density material that is formable into a film by sputtering, the following method has been conventionally used. That is, in this method, a film of the high saturation flux density material is initially formed by sputtering. Then, a mask made of a photoresist is formed on this film. The film is then selectively etched by ion beam etching, thereby patterning the film to form the magnetic layer. In this method, however, it has been difficult for a magnetic pole portion of 0.5 μm or less in width to be formed with high precision due to low etching rates of the ion beam etching and heavy erosion of the mask.

When a high saturation flux density material that is formable into a film by plating is used to form a magnetic layer as mentioned above, a magnetic layer including a magnetic pole portion of 0.5 to 0.6 μm or so in width can be formed by employing a selective plating method such as frame plating. For example, among the high saturation flux density materials that are formable into films by plating, NiFe having a higher Fe composition ratio can provide saturation flux densities of 1.5 to 1.6 T (tesla) and allow relatively stable control on composition. With CoNiFe, saturation flux densities around 1.8 T are attainable.

When the areal recording densities reach 80 to 120 Gbit/(inch)$^2$, however, track widths on the order of 0.1 to 0.2 μm are required. Such small track widths require that the magnetic pole portion be rendered around 4 to 5 μm in thickness so that a magnetic flux passing through the magnetic layer is prevented from being saturated before it reaches the medium facing surface. Nevertheless, it is extremely difficult to form a magnetic pole portion having a width on the order of 0.1 to 0.2 μm and a thickness on the order of 4 to 5 μm by plating. Hence, one may employ the following method to form the magnetic pole portion. That is, in the method, a magnetic pole portion having a width on the order of 0.5 to 0.6 μm and a thickness on the order of 4 to 5 μm is initially formed by plating. Then, the sidewalls of the magnetic pole portion are etched by ion beam etching, for example, so that the width of the magnetic pole portion is reduced to be on the order of 0.1 to 0.2 μm.

Reference is now made to FIGS. 57A to 61A and FIGS. 57B to 61B to describe an example of a method of manufacturing a thin-film magnetic head of related art, in which the magnetic pole portion is formed by the above-described method. FIGS. 57A to 61A are cross sections each orthogonal to the air bearing surface and the top surface of the substrate. FIGS. 57B to 61B are cross sections of the magnetic pole portion each parallel to the air bearing surface. According to the manufacturing method, as shown in FIGS. 57A and 57B, an insulating layer 102 made of alumina ($Al_2O_3$), for example, is deposited to a thickness of about 1 to 2 μm on a substrate 101 made of aluminum oxide and titanium carbide ($Al_2O_3$—TiC), for example. Next, on the insulating layer 102, a bottom shield layer 103 made of a magnetic material such as Permalloy is formed for a reproducing head. On the bottom shield layer 103, a bottom shield gap film 104 as an insulating film is formed to a thickness of 10 to 25 nm, for example.

On the bottom shield gap film 104, an MR element 105 for magnetic signal detection is formed to a thickness of tens of nanometers. Next, although not shown, a pair of electrode layers are formed to a thickness of tens of nanometers to be electrically connected to the MR element 105 on the bottom shield gap film 104. Next, a top shield gap film 107 as an insulating film is formed to a thickness of 10 to 25 nm, for example, on the bottom shield gap film 104 and the MR element 105. The MR element 105 is embedded in the shield gap films 104 and 107.

Next, on the top shield gap film 107, a top shield layer 108 of a magnetic material is formed to a thickness of about 3 μm. On the top shield layer 108, an insulating layer 109 made of alumina, for example, is formed to thickness of 0.2 μm, for example, for separating the recording head and the reproducing head from each other. Next, a bottom pole layer 110 is formed to a thickness of 1.5 to 2.0 μm, for example, on the insulating layer 109.

Next, as shown in FIGS. 58A and 58B, a recording gap layer 111 of an insulating material such as alumina is formed on the bottom pole layer 110 to a thickness of 100 nm, for example. Then, a contact hole is formed in the recording gap layer 111 at a position where the bottom pole layer 110 and a top pole layer to be described later are coupled to each other.

Next, although not shown, a thin magnetic film of, e.g., FeCo that is a high saturation flux density material, is formed by sputtering over the entire surface. On the magnetic film, a pole portion layer 112a and a coupling layer 112b of the top pole layer 112 are formed to a thickness of 4 to 5 μm by frame plating. The pole portion layer 112a is located near an air bearing surface to be described later. The pole portion layer 112a defines the recording track width. The coupling layer 112b is located in the position of the contact hole, and is connected to the bottom pole layer 110. At this stage, the pole portion layer 112a has a width of 0.5 to 0.6 μm.

Next, as shown in FIGS. 59A and 59B, sidewalls of the pole portion layer 112a are etched by ion beam etching so as to make the width of the pole portion layer 112a 0.1 to 0.2 μm or so. Furthermore, through this ion beam etching, the magnetic film, the recording gap layer 111 and the bottom pole layer 110 are also etched using the pole portion layer 112a and the coupling layer 112b as masks. This forms a trim structure in which the sidewalls of the magnetic pole portion of the top pole layer 112, the recording gap layer 111 and part of the bottom pole layer 110 are formed vertically in a self-aligned manner. Furthermore, the bottom pole layer 110 is provided with a recess to place a thin-film coil in.

Next, as shown in FIGS. 60A and 60B, an insulating film 113 made of alumina, for example, is formed over the entire surface. A thin-film coil 114 made of Cu, for example, is then formed to a thickness of 1.5 μm, for example, by frame plating on the insulating film 113 inside the above-mentioned recess. In FIG. 60A, the reference numeral 114a represents a connecting portion of the thin-film coil 114 to be connected to a lead layer described later.

Next, as shown in FIGS. 61A and 61B, a thick insulating layer 115 of alumina, for example, is formed over the entire surface, and then the top surface of the insulating layer 115 is flattened so that the pole portion layer 112a and the coupling layer 112b are exposed. Then, a portion of the insulating layer 115 lying over the connecting portion 114a of the thin-film coil 114 is removed by etching, so that the connecting portion 114a is exposed. On the surface thus flattened, a yoke portion layer 112c of the top pole layer 112 is formed so as to couple the pole portion layer 112a and the coupling layer 112b to each other. Here, the lead layer 116 is simultaneously formed to be connected to the connecting portion 114a. The yoke portion layer 112c is made of a magnetic material for making the recording head, such as Permalloy. Next, an overcoat layer 117 made of alumina, for example, is formed over the entire surface. The surface is then flattened and not-shown electrode pads are formed thereon. Finally, lapping of the slider including the foregoing layers is performed to form the air bearing surface 130 of the recording and reproducing heads. The thin-film magnetic head is thereby completed.

FIG. 62 is an explanatory diagram showing the cross section of the thin-film magnetic head shown in FIG. 61A in association with a plan view of the thin-film magnetic head in which the overcoat layer 117 and the yoke portion layer 112c are omitted.

In the manufacturing method illustrated in FIGS. 57A to 61A and FIGS. 57B to 61B, the sidewalls of the pole portion layer 112a are etched by ion beam etching as shown in FIG. 59B, so that the pole portion layer 112a is reduced in width. This can cause the following problems of the above-described manufacturing method.

A first problem is that the ion beam etching might reduce the pole portion layer 112a in thickness from an initial thickness of 4–5 μm to a thickness on the order of 1.5–2.0 μm. When the pole portion layer 112a becomes thus smaller in thickness, a magnetic flux passing through the top pole layer 112 is saturated before it reaches the air bearing surface 130, which makes it impossible to attain a sufficient overwrite property. To avoid this, it is conceivable that the initial thickness of the pole portion layer 112a could be made greater than 4 to 5 μm. For that purpose, however, the frame for forming the pole portion layer 112a must also be made greater in thickness, which makes it difficult to form the frame with high precision.

A second problem is that the above-described manufacturing method requires quite long time to etch the sidewalls of the pole portion layer 112a by the ion beam etching.

A third problem is that, because the above-described manufacturing method consumes quite long time to etch the sidewalls of the pole portion layer 112a, a portion of the pole portion layer 112a located near the top surface thereof may get thinner than a portion located near the recording gap layer 111, as shown in FIG. 59B. Consequently, the pole portion layer 112a tends to decrease in thickness, and the magnetic flux tends to become saturated near the interface between the pole portion layer 112a and the yoke portion layer 112c. In either case, the overwrite property deteriorates.

As a fourth problem, since the above-mentioned manufacturing method heavily etches the sidewalls of the pole portion layer 112a, the recording track width can vary greatly among a plurality of thin-film magnetic heads formed on one wafer and among different wafers, resulting in poor yields of the thin-film magnetic heads.

Meanwhile, even if the manufacturing method shown in FIGS. 57A to 61A and FIGS. 57B to 61B is used, the pole portion layer 112a can only attain saturation flux densities around 1.8 T at best, because the pole portion layer 112a must be made of a material that is formable by plating.

When the areal recording density reaches 80 to 120 Gbit/(inch)$^2$ and a track width of around 0.1 to 0.2 μm is demanded, the magnetic pole portion must be made of a material having a saturation flux density of around 2.0 to 2.4 T. In that case, the magnetic pole portion can no longer be formed by plating.

Thus, it has been difficult to manufacture a thin-film magnetic head having a small recording track width on the order of 0.1 to 0.2 μm while attaining a sufficient overwrite property.

OBJECTS AND SUMMARY OF THE INVENTION

A first object of the invention is to provide a method of etching a magnetic material film which makes it possible to obtain a finely-patterned magnetic material film.

A second object of the invention is to provide a method of manufacturing a thin-film magnetic head which makes it possible to form a magnetic pole portion of small width with high precision by using a high saturation flux density material.

A method of etching a magnetic material film according to the invention comprises the steps of:

generating activated species by exciting an etching gas containing a halogen type gas and a carbon compound type gas; and etching a magnetic material film by dry etching that includes chemical etching using the activated species.

In the etching method according to the invention, the magnetic material film is etched by using the activated species which are generated by exciting the etching gas containing a halogen type gas and a carbon compound type gas.

In the etching method according to the invention, the dry etching may be reactive ion etching.

In the etching method according to the invention, the carbon compound type gas may contain a carbon oxide type gas.

In the etching method according to the invention, the halogen type gas may contain at least either of $Cl_2$ and $BCl_3$.

In the etching method according to the invention, the etching gas may further contain $O_2$.

In the etching method according to the invention, the magnetic material film may be kept within a range of 50 to 700° C., 50 to 350° C., or 200 to 300° C. in temperature in the step of etching.

In the etching method according to the invention, the magnetic material film may be made of a metal magnetic material containing at least iron among the group consisting of iron, nickel, and cobalt. In this case, the metal magnetic material may contain cobalt.

The etching method according to the invention may further comprise the step of forming an etching mask on the magnetic material film before the step of generating the activated species.

The etching mask may be made of a metal material. In this case, the etching mask may be formed by plating. The metal material may be a magnetic material different from that constituting the magnetic material film. The metal material that is the above-mentioned magnetic material may contain nickel and iron. The metal material may contain nickel.

The etching mask may be made of an insulating material. In this case, the insulating material may be $Al_2O_3$.

The etching mask may include an insulating layer and a metal layer located thereon.

The etching method according to the invention may further comprise a second etching step to etch at least part of a region having undergone the etching in the step of etching, by different dry etching. The second etching step may use ion beam etching. In the ion beam etching, ion beams may travel at an angle within a range of 40° to 75°, or within a range of 40° to 50°, with respect to a direction perpendicular to a top surface of a base of the magnetic material film. The magnetic material film remaining after the etching in the step of etching may have sidewalls, and the sidewalls may be etched in the second etching step.

A method of manufacturing a thin-film magnetic head according to the invention is provided for manufacturing a thin-film magnetic head comprising:

a medium facing surface that faces toward a recording medium;

first and second pole layers that are magnetically coupled to each other and include magnetic pole portions opposed to each other and located in regions of the pole layers on a side of the medium facing surface;

a gap layer provided between the magnetic pole portions of the first and second pole layers; and a thin-film coil at least part of which is disposed between the first and second pole layers and insulated from the first and second pole layers.

The method of manufacturing the thin-film magnetic head comprises the steps of:

forming the first pole layer;

forming the thin-film coil on the first pole layer;

forming the gap layer on the magnetic pole portion of the first pole layer;

forming the second pole layer on the gap layer and the thin-film coil; and etching a magnetic material film in part, the magnetic material film constituting at least part of the first pole layer or at least part of the second pole layer, so as to pattern the at least part of the first pole layer or the at least part of the second pole layer, wherein in the step of etching, an etching gas containing a halogen type gas and a carbon compound type gas is excited to generate activated species, so that the magnetic material film is etched in part by dry etching that includes chemical etching using the activated species.

In the method of manufacturing the thin-film magnetic head of the invention, at least part of the first pole layer or at least part of the second pole layer is patterned by etching part of the magnetic material film by the above-mentioned dry etching.

In the method of manufacturing the thin-film magnetic head of the invention, the dry etching may be reactive ion etching.

In the method of manufacturing the thin-film magnetic head of the invention, the carbon compound type gas may contain a carbon oxide type gas.

In the method of manufacturing the thin-film magnetic head of the invention, the halogen type gas may contain at least either of $Cl_2$ and $BCl_3$.

In the method of manufacturing the thin-film magnetic head of the invention, the etching gas may further contain $O_2$.

In the method of manufacturing the thin-film magnetic head of the invention, the magnetic material film may be kept within a range of 50 to 700° C., 50 to 350° C., or 200 to 300° C. in temperature in the step of etching.

In the method of manufacturing the thin-film magnetic head of the invention, the magnetic material film may be made of a metal magnetic material containing at least iron among the group consisting of iron, nickel, and cobalt. In this case, the metal magnetic material may contain cobalt.

In the method of manufacturing the thin-film magnetic head of the invention, the magnetic material film may constitute the magnetic pole portion of the first pole layer. In this case, in the step of etching, the magnetic material film may be etched in part by using an etching mask formed on the magnetic material film. Alternatively, in the step of etching, the magnetic material film may be etched in part by using the gap layer formed on the magnetic material film, and the second pole layer, as masks. The method of manufacturing the thin-film magnetic head according to the invention may further comprise a second etching step to etch at least part of a region having undergone the etching in the step of etching, by different dry etching. The second etching step may use ion beam etching. The magnetic material film remaining after the etching in the step of etching may have sidewalls, and the sidewalls may be etched in the second etching step.

In the method of manufacturing the thin-film magnetic head of the invention, the magnetic material film may constitute the magnetic pole portion of the second pole layer. In this case, in the step of etching, the magnetic material film may be etched in part by using an etching mask formed on the magnetic material film. The etching mask may be formed by plating. The method of manufacturing the thin-film magnetic head according to the invention may further comprise a second etching step to etch at least part of a region having undergone the etching in the step of etching, by different dry etching. The second etching step may use ion beam etching. The magnetic material film remaining after the etching in the step of etching may have sidewalls, and the sidewalls may be etched in the second etching step.

Where the magnetic material film constitutes the magnetic pole portion of the second pole layer, the method of manufacturing the thin-film magnetic head according to the invention may further comprise the step of reducing a width of the magnetic pole portion of the second pole layer by etching sidewalls of a portion of the etched magnetic material film, the portion being to make the magnetic pole portion of the second pole layer. The step of reducing the width may use ion beam etching. The method of manufacturing the thin-film magnetic head according to the invention may further comprise the step of etching the gap layer by using the magnetic material film as a mask, after the step of reducing the width. The method of manufacturing the thin-film magnetic head according to the invention may further comprise the step of etching the first pole layer in part by using the magnetic material film and the gap layer as masks, after the step of etching the gap layer. In the step of etching the first pole layer in part, an etching gas containing a halogen type gas and a carbon compound type gas may be excited to generate activated species, so that the first pole layer is etched in part by dry etching that includes chemical etching using the activated species.

Where the magnetic material film constitutes the magnetic pole portion of the second pole layer, the method of manufacturing the thin-film magnetic head according to the invention may further comprise the step of etching the gap layer by using the etched magnetic material film as a mask. The method of manufacturing the thin-film magnetic head according to the invention may further comprise the step of etching the first pole layer in part by using the magnetic material film and the gap layer as masks, after the step of etching the gap layer. In the step of etching the first magnetic layer in part, an etching gas containing a halogen type gas and a carbon compound type gas may be excited to generate activated species, so that the first pole layer is etched in part by dry etching that includes chemical etching using the activated species. The method of manufacturing the thin-film magnetic head according to the invention may further comprise the step of reducing widths of the magnetic pole portion of the first pole layer and the magnetic pole portion of the second pole layer after the step of etching the first pole layer in part, by etching sidewalls of the magnetic pole portion of the first pole layer, sidewalls of the gap layer, and sidewalls of the magnetic pole portion of the second pole layer. The step of reducing the widths may use ion beam etching.

In the method of manufacturing the thin-film magnetic head according to the invention, the second pole layer may have a first layer that touches the gap layer, and a second layer located on the first layer; the magnetic material film may constitute the first layer; and, in the step of etching, the first layer may be patterned by etching the magnetic material film in part by using the second layer as a mask. In this case, the second layer may be formed by plating. The second layer may be made of a magnetic material different from that constituting the magnetic material film.

Other and further objects, features and advantages of the invention will appear more fully from the following description.

BRIEF DESCRIPTION OF THE DRAWINGS

FIGS. 1A and 1B are cross sections for illustrating a step in a method of manufacturing a thin-film magnetic head according to a first embodiment of the invention.

FIGS. 2A and 2B are cross sections for illustrating a step that follows FIGS. 1A and 1B.

FIGS. 3A and 3B are cross sections for illustrating a step that follows FIGS. 2A and 2B.

FIGS. 4A and 4B are cross sections for illustrating a step that follows FIGS. 3A and 3B.

FIGS. 5A and 5B are cross sections for illustrating a step that follows FIGS. 4A and 4B.

FIGS. 6A and 6B are cross sections for illustrating a step that follows FIGS. 5A and 5B.

FIGS. 7A and 7B are cross sections for illustrating a step that follows FIGS. 6A and 6B.

FIGS. 8A and 8B are cross sections for illustrating a step that follows FIGS. 7A and 7B.

FIGS. 9A and 9B are cross sections for illustrating a step that follows FIGS. 8A and 8B.

FIGS. 10A and 10B are cross sections for illustrating a step that follows FIGS. 9A and 9B.

FIGS. 13A and 13B are cross sections for illustrating a step that follows FIGS. 12A and 12B.

FIGS. 14A and 14B are cross sections for illustrating a step that follows FIGS. 13A and 13B.

FIGS. 15A and 15B are cross sections for illustrating a step that follows FIGS. 14A and 14B.

FIGS. 16A and 16B are cross sections for illustrating a step in a modified example of the method of manufacturing the thin-film magnetic head according to the first embodiment of the invention.

FIGS. 23A and 23B are cross sections for illustrating a step in a method of manufacturing a thin-film magnetic head according to a second embodiment of the invention.

FIGS. 24A and 24B are cross sections for illustrating a step that follows FIGS. 23A and 23B.

FIGS. 25A and 25B are cross sections for illustrating a step that follows FIGS. 24A and 24B.

FIGS. 26A and 26B are cross sections for illustrating a step that follows FIGS. 25A and 25B.

FIGS. 27A and 27B are cross sections for illustrating a step that follows FIGS. 26A and 26B.

FIGS. 28A and 28B are cross sections for illustrating a step that follows FIGS. 27A and 27B.

FIGS. 29A and 29B are cross sections for illustrating a step that follows FIGS. 28A and 28B.

FIGS. 30A and 30B are cross sections for illustrating a step that follows FIGS. 29A and 29B.

FIGS. 31A and 31B are cross sections for illustrating a step that follows FIGS. 30A and 30B.

FIGS. 32A and 32B are cross sections for illustrating a step that follows FIGS. 31A and 31B.

FIGS. 35A and 35B are cross sections for illustrating a step in a method of manufacturing a thin-film magnetic head according to a third embodiment of the invention.

FIGS. 36A and 36B are cross sections for illustrating a step that follows FIGS. 35A and 35B.

FIGS. 37A and 37B are cross sections for illustrating a step that follows FIGS. 36A and 36B.

FIGS. 38A and 38B are cross sections for illustrating a step that follows FIGS. 37A and 37B.

FIGS. 39A and 39B are cross sections for illustrating a step that follows FIGS. 38A and 38B.

FIGS. 40A and 40B are cross sections for illustrating a step that follows FIGS. 39A and 39B.

FIGS. 41A and 41B are cross sections for illustrating a step that follows FIGS. 40A and 40B.

FIGS. 42A and 42B are cross sections for illustrating a step that follows FIGS. 41A and 41B.

FIGS. 43A and 43B are cross sections for illustrating a step that follows FIGS. 42A and 42B.

FIGS. 44A and 44B are cross sections for illustrating a step that follows FIGS. 43A and 43B.

FIGS. 45A and 45B are cross sections for illustrating a step that follows FIGS. 44A and 44B.

FIGS. 46A and 46B are cross sections for illustrating a step in a method of manufacturing a thin-film magnetic head according to a fourth embodiment of the invention.

FIGS. 47A and 47B are cross sections for illustrating a step that follows FIGS. 46A and 46B.

FIGS. 48A and 48B are cross sections for illustrating a step that follows FIGS. 47A and 47B.

FIGS. 49A and 49B are cross sections for illustrating a step that follows FIGS. 48A and 48B.

FIGS. 50A and 50B are cross sections for illustrating a step that follows FIGS. 49A and 49B.

FIGS. 51A and 51B are cross sections for illustrating a step that follows FIGS. 50A and 50B.

FIGS. 52A and 52B are cross sections for illustrating a step that follows FIGS. 51A and 51B.

FIGS. 55A and 55B are cross sections for illustrating a step that follows FIGS. 54A and 54B.

FIGS. 56A and 56B are cross sections for illustrating a step that follows FIGS. 55A and 553B.

FIGS. 57A and 57B are cross sections for illustrating a step in a method of manufacturing a thin-film magnetic head of related art.

FIGS. 58A and 58B are cross sections for illustrating a step that follows FIGS. 57A and 57B.

FIGS. 59A and 59B are cross sections for illustrating a step that follows FIGS. 58A and 58B.

FIGS. 60A and 60B are cross sections for illustrating a step that follows FIGS. 59A and 59B.

DETAILED DESCRIPTION OF THE PREFERRED EMBODIMENTS

Figure 11A:
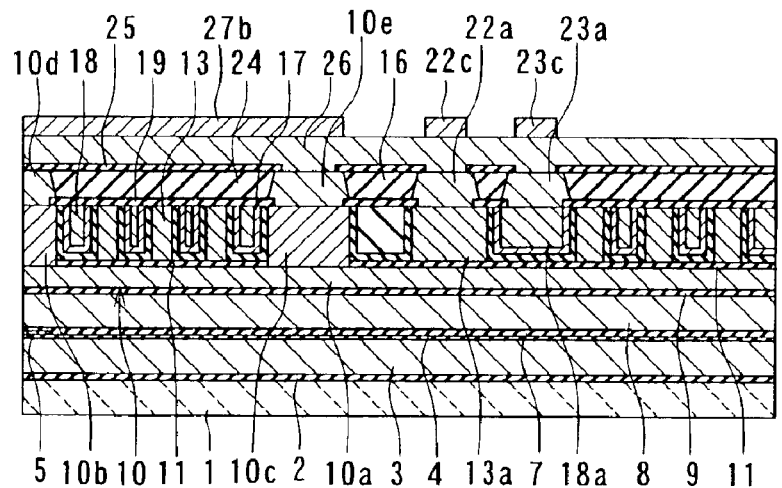
FIGS. 11A and 11B are cross sections for illustrating a step that follows FIGS. 10A and 10B.

Embodiments of the invention will now be described in detail with reference to the accompanying drawings.

[First Embodiment]

Reference is now made to FIGS. 1A to 15A and FIGS. 1B to 15B to describe a method of manufacturing a thin-film magnetic head according to a first embodiment of the invention. FIGS. 1A to 15A are cross sections each orthogonal to the air bearing surface and the top surface of the substrate. FIGS. 1B to 15B are cross sections of the magnetic pole portion each parallel to the air bearing surface.

In the method of manufacturing the thin-film magnetic head of the present embodiment, as shown in FIGS. 1A and 1B, an insulating layer 2 made of alumina ($Al_2O_3$), for example, is first deposited to a thickness of about 2 to 5 $\mu$m on a substrate 1 made of aluminum oxide and titanium carbide ($Al_2O_3$—TiC), for example. On the insulating layer 2, a bottom shield layer 3 of a magnetic material such as Permalloy is formed to a thickness of about 2 to 3 $\mu$m for making a reproducing head. The bottom shield layer 3 is selectively formed on the insulating layer 2 by plating using a photoresist film as a mask, for example. Then, although not shown, an insulating layer made of alumina, for example, is formed over the entire surface to a thickness of 3 to 4 $\mu$m, for example. The insulating layer is then polished through chemical mechanical polishing (hereinafter referred to as CMP), for example, to expose the bottom shield layer 3, and the surface is thereby flattened.

On the bottom shield layer 3, a bottom shield gap film 4 serving as an insulating film is formed to a thickness of about 20 to 40 nm, for example. On the bottom shield gap film 4, an MR element 5 for magnetic signal detection is formed to a thickness of tens of nanometers. For example, the MR element 5 may be formed by selectively etching an MR film formed by sputtering. The MR element 5 is located near a region where to form an air bearing surface to be described later. The MR element 5 may be an element utilizing a magnetosensitive film that exhibits magnetoresistivity, such as an AMR element, a GMR element or a TMR (tunnel magnetoresistive) element. Next, although not shown, a pair of electrode layers to be electrically connected to the MR element 5 are formed to a thickness of tens of nanometers on the bottom shield gap film 4. Then, a top shield gap film 7 serving as an insulating film is formed to a thickness of about 20 to 40 nm, for example, on the bottom shield gap film 4 and the MR element 5. The MR element 5 is embedded in the shield gap films 4 and 7. Examples of insulating materials to be used for the shield gap films 4 and 7 include alumina, aluminum nitride, and diamond-like carbon (DLC). The shield gap films 4 and 7 may be formed by sputtering or chemical vapor deposition (hereinafter referred to as CVD).

On the top shield gap film 7, a top shield layer 8 of a magnetic material is selectively formed to a thickness of approximately 1.0 to 1.5 $\mu$m for the reproducing head. Then, an insulating layer 9 made of alumina, for example, is formed to a thickness of approximately 0.15 to 0.2 $\mu$m over the entire top surface of the laminate obtained through the foregoing steps. On the insulating layer 9, a first layer 10a of a bottom pole layer 10 is formed to a thickness of approximately 2.0 to 2.5 $\mu$m. The bottom pole layer 10 includes the first layer 10a, and a second layer 10b, a third layer 10d, and coupling layers 10c and 10e to be described later.

The first layer 10a is formed of a high saturation flux density material such as FeAlN, FeN, FeCo, CoFeN, and FeZrN to a thickness of 0.5 to 1.0 $\mu$m by sputtering. The first layer 10a may also be formed by plating, using NiFe (Ni: 80 weight %; Fe: 20 weight %), or NiFe (Ni: 45 weight %; Fe: 55 weight %) that is a high saturation flux density material.

Next, as shown in FIGS. 2A and 2B, an insulating film 11 made of alumina, for example, is formed to a thickness of 0.2 $\mu$m on the first layer 10a. The insulating film 11 is then selectively etched to form openings in the insulating film 11 at positions where to form the second layer 10b and the coupling layer 10c.

Next, although not shown, an electrode film of a conductive material is formed to a thickness of 50 to 80 nm by sputtering, for example, so as to cover the first layer 10a and the insulating film 11. This electrode film functions as an electrode and a seed layer for plating. Then, although not shown, a frame to be used for forming a first thin-film coil 13 by frame plating is formed on the electrode film by photolithography.

Next, electroplating is performed using the electrode film, to form the first thin-film coil 13 of Cu, for example, to a thickness of approximately 2.0 to 2.5 $\mu$m. The first thin-film coil 13 is disposed within the region where the insulating film 11 lies. In FIG. 2A, the reference numeral 13a represents a connecting portion of the first thin-film coil 13 that is to be connected to a lead layer described later. The electrode film, except for a portion thereof underlying the first thin-film coil 13, is then removed by ion beam etching, for example.

Next, although not shown, a frame to be used for forming the second layer 10b and the coupling layer 10 c by frame plating is formed on the first layer 10a and the insulating film 11 by photolithography.

Next, as shown in FIGS. 3A and 3B, electroplating is performed to form the second layer 10b and the coupling layer 10c of a magnetic material to a thickness of 2 to 3 $\mu$m each, for example, on the first layer 10a. For example, the material of the second layer 10b and the coupling layer 10c may be CoNiFe (Co: 67%, Ni: 15%, Fe: 18%) having a saturation flux density of 1.8 to 1.9 T, or FeCo (Fe: approximately 60%, Co: approximately 40%) having a saturation flux density of 2.4 T. In the present embodiment, the second layer 10b and the coupling layer 10c are formed by plating without any special electrode film, but using the unpatterned first layer 10a as an electrode and a seed layer for plating.

The second layer 10b is disposed near the region where to form the air bearing surface described later. The coupling layer 10c is a portion for connecting the first layer 10a and a top pole layer to be described later to each other, and is disposed near the center of the first thin-film coil 13.

In the present embodiment, a part of the first thin-film coil 13 located farther from the air bearing surface than the coupling layer 10c is greater in the line width of the winding and the winding pitch than a part located closer to the air bearing surface than the coupling layer 10c. This serves to attain a smaller yoke length and to reduce the total resistance value of the first thin-film coil 13.

Next, although not shown, a photoresist layer is formed to cover the first thin-film coil 13, the second layer 10b and the coupling layer 10c. Using this photoresist layer as a mask, the first layer 10a is selectively etched by ion beam etching, for example, to thereby pattern the first layer 10a.

Then, after removing the photoresist layer, an intercoil insulating film 14 made of alumina, for example, is formed to a thickness of 0.1 to 0.2 $\mu$m by CVD, for example, so as to cover the entire top surface of the laminate. The insulating film 14 may be a film formed by CVD, in which $H_2O$, $N_2$, $N_2O$, or $H_2O_2$ as a material for use in thin film formation and $Al(CH_3)_3$ or $AlCl_3$ as a material for use in thin film formation are ejected alternately and intermittently under reduced pressure at temperatures of 100° C. or higher, for example. According to this forming method, a plurality of thin alumina films are laminated into the insulating film 14 of desired thickness.

Next, as shown in FIGS. 4A and 4B, an insulating layer 15 made of photoresist, for example, is formed in a region where to form a second thin-film coil 18 to be described later. The insulating layer 15 is formed to fill at least a space between turns of the first thin-film coil 13. Part of the insulating layer 15 is disposed outside the outer periphery of the first thin-film coil 13 and inside the inner periphery of the same. Then, an insulating layer 16 made of alumina, for example, is formed to a thickness of 3 to 4 $\mu$m so as to cover the intercoil insulating film 14 and the insulating layer 15.

Next, as shown in FIGS. 5A and 5B, the insulating layers 15 and 16 are polished by CMP, for example, so that the insulating layer 15 is exposed and the top surfaces of the insulating layers 15 and 16 are flattened.

Next, as shown in FIGS. 6A and 6B, after removing the insulating layer 15, a first conductive film of Ta or Ti is formed to a thickness of 10 to 20 nm by sputtering, for example, so as to cover the entire top surface of the laminate. On the first conductive film, a second conductive film made of Cu, for example, is formed by CVD to a thickness of 50 nm, for example. The second conductive film is not intended to fill the grooves between the turns of the first thin-film coil 13, but formed to cover the grooves by making use of the excellent step coverage of CVD. The two conductive films mentioned above will be referred to collectively as an electrode film 17. The electrode film 17 functions as an electrode and a seed layer for plating. On the electrode film 17, a conductive layer 18p made of Cu, for example, is formed by plating to a thickness of 3 to 4 $\mu$m, for example.

Next, as shown in FIGS. 7A and 7B, the conductive layer 18p is polished by CMP, for example, so that the second layer 10b, the coupling layer 10c and the first thin-film coil 13 are exposed. As a result, the conductive layer 18p remaining in the grooves between the turns of the first thin-film coil 13 makes the second thin-film coil 18. The polishing mentioned above is performed so that the first thin-film coil 13 and the second thin-film coil 18 each have a thickness of 2.0 to 2.5 $\mu$m, for example. Although not shown, the second thin-film coil 18 is connected to the first thin-film coil 13 such that a contiguous winding is formed by the thin-film coils 13 and 18. In FIG. 7A, the reference numeral 18a represents a connecting portion of the second thin-film coil 18 that is to be connected to a lead layer described later.

As shown in FIGS. 8A and 8B, a coil coat insulating film 19 made of alumina, for example, is formed to a thickness of 0.1 to 0.3 µm to cover the entire top surface of the laminate. Then, the coil coat insulating film 19 is selectively etched to remove portions thereof corresponding to the second layer 10b, the coupling layer 10c, the connecting portion 13a of the first thin-film coil 13, and the connecting portion 18a of the second thin-film coil 18. The coil coat insulating film 19 after the etching covers the top surfaces of the thin-film coils 13 and 18 except for the connecting portion 13a of the first thin-film coil 13 and the connecting portion 18a of the second thin-film coil 18.

Next, a magnetic layer 20 of a magnetic material is formed to a thickness of 0.8 to 1.2 µm by sputtering, so as to cover the entire top surface of the laminate. For example, the magnetic layer 20 is made of a metal magnetic material that contains at least iron among the group consisting of iron (Fe), nickel (Ni), and cobalt (Co). Such magnetic materials include NiFe, CoNiFe, FeCo, FeN, and CoFeN. Of these, Co-containing high saturation flux density materials such as CoNiFe having a saturation flux density of 1.8 to 1.9 T, and FeCo or CoFeN having a saturation flux density of 2.3 to 2.4 T are preferably used in the present embodiment.

Next, etching masks 21a, 21b, 21c, and 21d are formed to a thickness of 1 to 2 µm each on the magnetic layer 20 at the portions corresponding to the second layer 10b, the coupling layer 10c, the connecting portion 13a of the first thin-film coil 13, and the connecting portion 18a of the second thin-film coil 18, respectively.

The masks 21a to 21d may be made of a metal material. In this case, the masks 21a to 21d may be formed by plating, or by frame plating in particular. The masks 21a to 21d may also be made of a magnetic material different from the material constituting the magnetic layer 20. This magnetic material may be a Ni- or Fe-containing material such as NiFe and CoNiFe. The masks 21a to 21d may also be made of a Ni-containing material such as Ni, NiCu, NiP, and NiB.

The material of the masks 21a to 21d may also be an insulating material such as alumina. In this case, the masks 21a to 21d are formed by sputtering, for example, using a photoresist layer as a mask.

Next, as shown in FIGS. 9A and 9B, the magnetic layer 20 is etched by reactive ion etching (hereinafter referred to as RIE) using the masks 21a to 21d. As a result of the etching, portions of the magnetic layer 20 remaining under the masks 21a to 21d make the third layer 10d, the coupling layer 10e, a connecting layer 22a, and a connecting layer 23a, respectively. The third layer 10d is located on the second layer 10b, the coupling layer 10e is located on the coupling layer 10c, the connecting layer 22a is located on the connecting portion 13a, and the connecting layer 23a is located on the connecting portion 18a. The method of etching the magnetic layer 20 by RIE will be detailed later.

In the present embodiment, after the etching of the magnetic layer 20 by RIE, at least part of the region, or the whole region for example, which has undergone the RIE, may be slightly etched by different dry etching, such as ion beam etching. This yields the following effects. First, etching residuals lying on the region having undergone the RIE can be eliminated to clean the surface of the region. Additionally, since the third layer 10d, the coupling layer 10e, and the connecting layers 22a and 23a that have been formed by the RIE are slightly etched at the sidewalls thereof, it is possible to clean the surfaces of those sidewalls. Furthermore, it is possible to remove molecules of the halogen type gas such as chlorine molecules that have adhered to those sidewalls in the course of the RIE, so that those sidewalls can be protected from corrosion. Furthermore, as shown in FIG. 9A, the sidewalls of the third layer 10d make inclined surfaces such that each of the sidewalls of the third layer 10d forms an angle of smaller than 90° with the top surface of the base of the third layer 10d. Consequently, it is possible to prevent the magnetic flux passing through the bottom pole layer 10 from being saturated on the way and to thereby introduce the magnetic flux to the vicinity of a recording gap layer to be described later.

The end of the third layer 10d located farther from the air bearing surface defines the throat height of the recording head. The throat height is the length (height) of the magnetic pole portions, that is, the portions of the two pole layers opposed to each other with the recording gap layer in between, as taken from the air-bearing-surface-side end to the other end.

Next, as shown in FIGS. 10A and 10B, an insulating layer 24 made of alumina, for example, is formed to a thickness of 1.5 to 2.0 µm so as to cover the entire top surface of the laminate. The insulating layer 24 is then polished by CMP, for example. This polishing is performed so as to remove the masks 21a to 21d and to flatten the top surfaces of the third layer 10d, the coupling layer 10e, the connecting layers 22a and 23a, and the insulating layer 24.

Figure 11B:
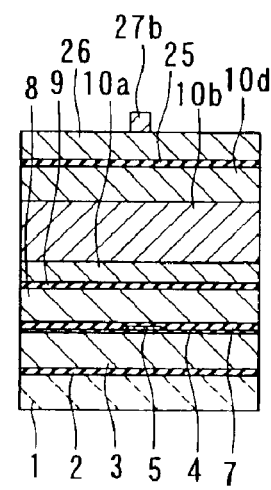

Next, as shown in FIGS. 11A and 11B, the recording gap layer 25 is formed to a thickness of 0.08 to 0.1 µm so as to cover the entire top surface of the laminate. The recording gap layer 25 may be made of an insulating material such as alumina or a nonmagnetic metal material such as Ru, NiCu, and NiB. Then, portions of the recording gap layer 25 corresponding to the coupling layer 10e and the connecting layers 22a, 23a are selectively etched.

Next, a magnetic layer 26 of a magnetic material is formed by sputtering, for example, to a thickness of 0.5 to 1.0 µm so as to cover the entire top surface of the laminate. For example, the magnetic layer 26 is made of a metal magnetic material that contains at least iron among the group consisting of iron, nickel, and cobalt. Such magnetic materials include NiFe, CoNiFe, FeCo, FeN, and CoFeN. Of these, Co-containing high saturation flux density materials such as CoNiFe having a saturation flux density of 1.8 to 1.9 T and FeCo or CoFeN having a saturation flux density of 2.3 to 2.4 T, for example, are preferably used in the present embodiment.

Next, a second layer 27b of a top pole layer 27 to be described later and lead layers 22c, 23c are formed to a thickness of 1 to 2 µm on the magnetic layer 26 by frame plating, for example. The second layer 27b and the lead layers 22c, 23c are made of a metal magnetic material such as NiFe or CoNiFe, which is different from the material constituting the magnetic material 26. The second layer 27b is arranged to extend from a position corresponding to the third layer 10d of the bottom pole layer 10 to a position corresponding to the coupling layer 10e. The lead layer 22c is arranged to extend from a position corresponding to the connecting layer 22a. The lead layer 23c is arranged to extend from a position corresponding to the connecting layer 23a.

Figure 12A:
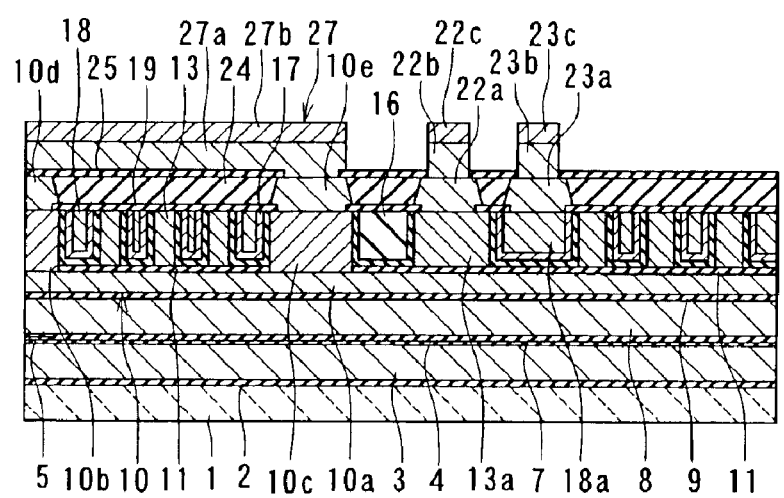
FIGS. 12A and 12B are cross sections for illustrating a step that follows FIGS. 11A and 11B.
Figure 12B:
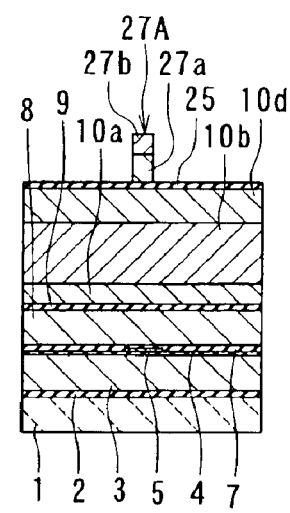

Next, as shown in FIGS. 12A and 12B, the magnetic layer 26 is selectively etched by RIE using the second layer 27b and the lead layers 22c, 23c as etching masks. Consequently, the portions of the magnetic layer 26 remaining after the etching make a first layer 27a of the top pole layer 27 and lead layers 22b, 23b. The lead layer 22b is located under the lead layer 22c, and the lead layer 23b under the lead layer 23c. The method of etching the magnetic layer 26 by RIE will be detailed later. In the present embodiment, after the etching of the magnetic layer 26 by RIE, at least part of the region, or the whole region for example, which has undergone the RIE, may be slightly etched by different dry etching, such as ion beam etching. This yields the following effects. First, etching residuals lying on the region having undergone the RIE can be eliminated to clean the surface of the region. Additionally, since the first layer 27a and the lead layers 22b, 23b that have been formed by the RIE are slightly etched at the sidewalls thereof, it is possible to clean the surfaces of those sidewalls. Furthermore, it is possible to remove molecules of the halogen type gas such as chlorine molecules that have adhered to those sidewalls in the course of the RIE, so that those sidewalls can be protected from corrosion.

The top pole layer 27 has the first layer 27a that touches the recording gap layer 25, and the second layer 27b that is located on the first layer 27a. The top pole layer 27 includes: a track width defining portion 27A having an end located at the air bearing surface and the other end located away from the air bearing surface; and a yoke portion 27B (see FIG. 18) connected to the other end of the track width defining portion 27A. The yoke portion 27B has a width equal to that of the track width defining portion 27A at the interface with the track width defining portion 27A. The width of the yoke portion 27B gradually increases from this interface with an increase in distance from the track width defining portion 27A, and finally becomes constant. The track width defining portion 27A is the magnetic pole portion of the top pole layer 27, and defines the recording track width. When forming the first layer 27a by RIE, the track width defining portion 27A is given an initial width of the order of 0.1 to 0.2 μm. Here, by way of example, the track width defining portion 27A initially has a width of 0.15 μm.

Next, as shown in FIGS. 13A and 13B, the sidewalls of the track width defining portion 27A of the top pole layer 27 are etched by ion beam etching, for example, so that the width of the track width defining portion 27A is reduced to 0.1 μm, for example. For example, this etching is performed so that ion beams travel at an angle of 40 to 50° with respect to a direction perpendicular to the top surface of the first layer 10a.

Next, although not shown, a photoresist mask having an opening around the track width defining portion 27A is formed. Then, as shown in FIGS. 14A and 14B, the recording gap layer 25 around the track width defining portion 27A is etched by RIE with a mixed gas of $Cl_2$ and $BCl_3$ as the etching gas, or by ion beam etching, for example, using the above-mentioned photoresist mask and the top pole layer 27 as masks.

Then, the top pole layer 27, the recording gap layer 25 lying below the same, and the above-mentioned photoresist mask are used as masks to etch part of the third layer 10d of the bottom pole layer 10 at around the track width defining portion 27A by ion beam etching, for example. This etching may be effected by combining an ion beam etching in which ion beams travel at an angle of 0° with respect to the direction perpendicular to the top surface of the first layer 10a with an ion beam etching in which the above-mentioned angle is 45°. To etch the third layer 10d by focused ion beam etching, the ion beam etching may be performed so that the above-mentioned angle falls within the range of 40° to 75°. Also, for the purpose of slightly etching the sidewalls of the third layer 10d or eliminating etching residuals of FeCo and the like resulting from the RIE, ion beam etching may be performed so that the above-mentioned angle falls within the range of 40° to 75°. Here, by way of example, the ion beam etching is performed so that the above-mentioned angle falls within the range of 40° to 50°. The third layer 10d may be etched by RIE under the same conditions as those for the magnetic layer 26, instead of ion beam etching. In this case, the recording gap layer 25, which is an insulating layer, and the top pole layer 27, which is a metal layer located thereon, serve as the etching masks.

A trim structure as shown in FIG. 14B is thereby formed. The trim structure suppresses an increase in the effective recording track width due to expansion of a magnetic flux generated during writing in a narrow track. A portion of the third layer 10d that is opposed to the track width defining portion 27A of the top pole layer 27 with the recording gap layer 25 in between is the magnetic pole portion of the bottom pole layer 10.

The third layer 10d yet to be etched has a thickness greater than the etching depth of the third layer 10d. Consequently, the trim structure can be formed while preventing the magnetic flux passing through the bottom pole layer 10 from being saturated before it reaches the air bearing surface.

Figure 18:
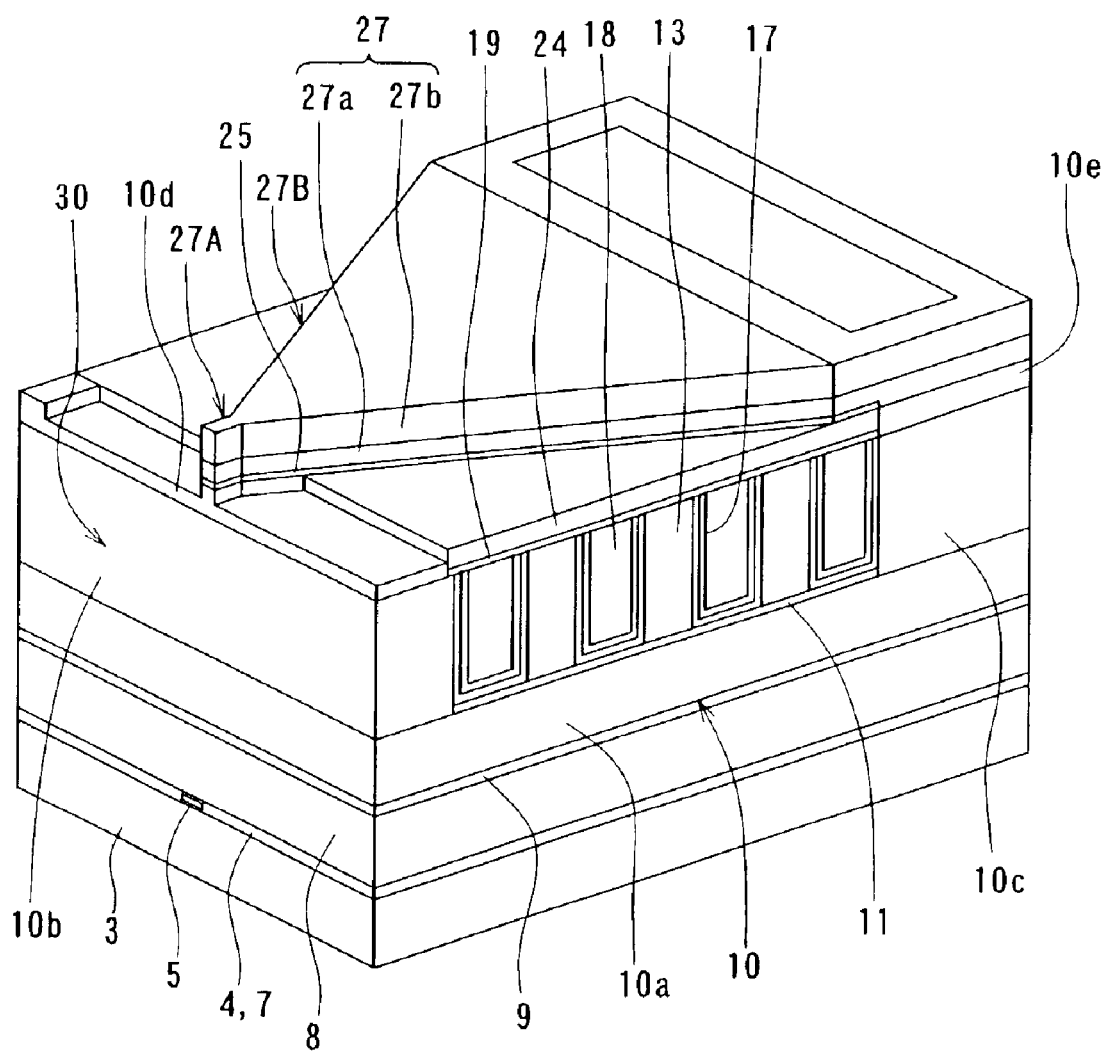
FIG. 18 is a perspective view of the thin-film magnetic head of the first embodiment of the invention.

Next, as shown in FIGS. 15A and 15B, an overcoat layer 29 of alumina, for example, is formed to a thickness of 20 to 30 μm so as to cover the entire top surface of the laminate. The surface is flattened, and not-shown electrode pads are formed thereon. Finally, lapping of the slider including the foregoing layers is performed to form the air bearing surface 30 of the recording and reproducing heads. The thin-film magnetic head is thereby completed. FIG. 18 is a perspective view of the thin-film magnetic head with the overcoat layer 29 omitted. FIG. 18 shows the track width defining portion 27A and the yoke portion 27B of the top pole layer 27.

Figure 17A:
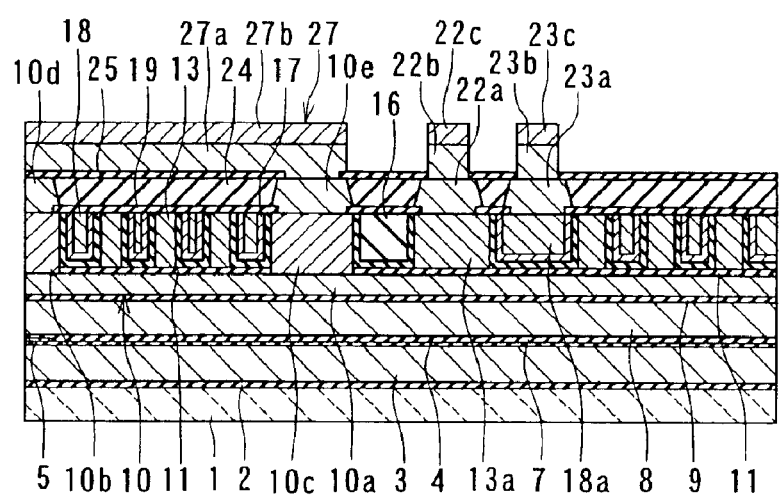
FIGS. 17A and 17B are cross sections for illustrating a step that follows FIGS. 16A and 16B.
Figure 17B:
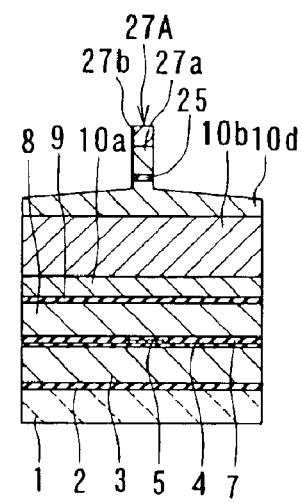

Reference is now made to FIGS. 16A, 16B, 17A and 17B to describe a modified example of the method of manufacturing the thin-film magnetic head according to the present embodiment. FIGS. 16A and 17A are cross sections each orthogonal to the air bearing surface and the top surface of the substrate. FIGS. 16B and 17B are cross sections of the magnetic pole portion each parallel to the air bearing surface. This modified example has the same steps as those described with reference to FIGS. 1A to 12A and FIGS. 1B to 12B up to the step of forming the first layer 27a and the lead layers 22b, 23b by selectively etching the magnetic layer 26 by RIE using the second layer 27b and the lead layers 22c, 23c as the etching masks.

Next, although not shown, a photoresist mask having an opening around the track width defining portion 27A is formed. As shown in FIGS. 16A and 16B, the recording gap layer 25 around the track width defining portion 27A is etched, for example, by RIE with a mixed gas of $Cl_2$ and $BCl_3$ as the etching gas or by ion beam etching, using the above-mentioned photoresist mask and the top pole layer 27 as masks.

Next, as shown in FIGS. 17A and 17B, the top pole layer 27, the recording gap layer 25 below the same, and the above-mentioned photoresist mask are used as masks to etch part of the third layer 10d of the bottom pole layer 10 at around the track width defining portion 27A by ion beam etching, for example. This etching may be effected, for example, by combining an ion beam etching in which ion beams travel at an angle of 0° with respect to the direction perpendicular to the top surface of the first layer 10a, with an ion beam etching in which the above-mentioned angle is 45°. To etch the third layer 10d by focused ion beam etching, the ion beam etching may be performed so that the above-mentioned angle falls within the range of 40° to 75°. Also, for the purpose of slightly etching the sidewalls of the third layer 10d or eliminating etching residuals of FeCo or the like resulting from the RIE, ion beam etching may be performed so that the above-mentioned angle falls within the range of 40° to 75°. Here, by way of example, the ion beam etching is performed so that the above-mentioned angle falls within the range of 40° to 50°. The third layer 10d may be etched by RIE under the same etching conditions as those for the magnetic layer 26, instead of ion beam etching.

Next, the sidewalls of the track width defining portion 27A, and the sidewalls of each of the recording gap layer 25 and the third layer 10d that lie under the track width defining portion 27A, are etched by ion beam etching, for example, so that the track width defining portion 27A of the top pole layer 27 has a width of, e.g., 0.1 μm. The track width defining portion 27A, and the recording gap layer 25 and third layer 10d lying under the same are thereby reduced in width. For example, this etching is performed so that ion beams travel at an angle of 40 to 50° with respect to the direction perpendicular to the top surface of the first layer 10a. This forms the same trim structure as that shown in FIG. 14B. The subsequent steps of the modified example are the same as the steps described with reference to FIG. 15A and FIG. 15B.

The thin-film magnetic head manufactured by the manufacturing method according to the present embodiment has the air bearing surface 30 serving as a medium facing surface that faces toward a recording medium, and the reproducing head and the recording head (induction-type electromagnetic transducer).

The reproducing head includes: the MR element 5 located near the air bearing surface 30; the bottom shield layer 3 and the top shield layer 8 for shielding the MR element 5, portions of the bottom and top shield layers 3 and 8 located on a side of the air bearing surface 30 being opposed to each other with the MR element 5 in between; the bottom shield gap film 4 located between the MR element 5 and the bottom shield layer 3; and the top shield gap film 7 located between the MR element 5 and the top shield layer 8.

The recording head comprises: the bottom pole layer 10 and the top pole layer 27 magnetically coupled to each other and including the magnetic pole portions that are opposed to each other and located in regions of the pole layers on the side of the air bearing surface 30; the recording gap layer 25 provided between the magnetic pole portion of the bottom pole layer 10 and the magnetic pole portion of the top pole layer 27; and the thin-film coils 13 and 18, at least part of each of the coils being disposed between the bottom and top pole layers 10 and 27 and insulated from the bottom and top pole layers 10 and 27.

The bottom pole layer 10 includes: the first layer 10a located to face toward the thin-film coils 13 and 18; the second layer 10b located closer to the air bearing surface 30 than the thin-film coils 13 and 18 are, and connected to the surface of the first layer 10a that is closer to the recording gap layer 25; and the third layer 10d, one of surfaces of which is connected to the surface of the second layer 10b closer to the recording gap layer 25, and the other of the surfaces of which is adjacent to the recording gap layer 25. The top pole layer 27 includes the first layer 27a and the second layer 27b that are both flat. The bottom pole layer 10 and the top pole layer 27 of the embodiment correspond to the first pole layer and the second pole layer of the invention, respectively.

The method of manufacturing a thin-film magnetic head according to the embodiment includes the step of etching the magnetic material film in part, the magnetic material film constituting at least part of the bottom pole layer 10 or at least part of the top pole layer 27, so as to pattern the at least part of the bottom pole layer 10 or the at least part of the top pole layer 27. This magnetic material film is, Specifically, the magnetic layers 20 and 26.

The method of etching the magnetic material film according to the embodiment will now be described in detail, taking the method of etching the magnetic layers 20 and 26 as an example. The method of etching the magnetic layers 20 and 26 of the present embodiment includes the steps of: generating activated species by exciting an etching gas containing a halogen type gas and a carbon compound type gas; and etching the magnetic layers 20 and 26 by dry etching that includes chemical etching using the activated species. In the present embodiment, RIE, in particular, is employed as the dry etching mentioned above. The etching of the third layer 10d of the bottom pole layer 10 for the purpose of forming the trim structure may be effected by the same etching method as that for the magnetic layers 20 and 26. In this case, the third layer 10d may also be referred to as the magnetic material film.

Figure 19:
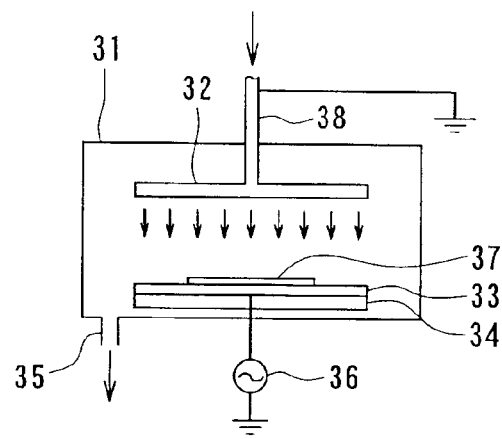
FIG. 19 is an explanatory diagram showing an example of a configuration of an RIE system to be used for etching the magnetic layer in the first embodiment of the invention.

Reference is now made to FIG. 19 to describe an example of a configuration of an RIE system to be used for etching the magnetic layers 20 and 26. FIG. 19 illustrates a parallel plate RIE system. This RIE system comprises a chamber 31, and a top electrode 32, a bottom electrode 33 and a heater 34 that are provided in the chamber 31. The top electrode 32 and the bottom electrode 33 are arranged in parallel. A sample 37 such as a wafer is placed on the surface of the bottom electrode 33 facing toward the top electrode 32. The heater 34 is arranged in contact with the surface of the bottom electrode 33 opposite to the one on which the sample 37 is placed. A gas supply channel 38 is connected to the top electrode 32. Although not shown, a plurality of gas nozzles communicating with the gas supply channel 38 are provided in the surface of the top electrode 32 facing toward the bottom electrode 33. The etching gas supplied to the gas supply channel 38 is ejected from the gas nozzles. The chamber 31 has an outlet 35 for exhausting the gas from the chamber 31. The bottom electrode 33 is connected to a high frequency power source 36 for applying a high frequency voltage to the bottom electrode 33. The top electrode 32 is grounded. The heater 34 heats the sample 37 via the bottom electrode 33 so that the sample 37 reaches a predetermined temperature.

Next, the principle of RIE is briefly described with reference to FIG. 19. To perform RIE, the chamber 31 is initially depressurized. The etching gas is supplied into the chamber 31 through the gas supply channel 38, and a high frequency voltage is applied to the bottom electrode 33 from the high frequency power source 36. The etching gas contains reactive gas. The chamber 31 causes plasma inside, in which the etching gas is excited to generate activated species. In the chamber 31, the etching gas also produces ions. The ions impinge on the surface of the sample 37, thereby physically etching the sample 37. On the other hand, the activated species react with the sample 37, and the sample 37 is thereby etched chemically.

The RIE system for use in the RIE in the present embodiment is not limited to a parallel plate RIE system as shown in FIG. 19, but may be ones of other types such as a triode RIE system, a magnetron RIE system, a microwave RIE system, and a high density plasma etching system.

Now, description will be given of the characteristics of the method of etching the magnetic layers 20 and 26 by RIE according to the present embodiment. In the embodiment, an etching gas that contains a halogen type gas and a carbon compound type gas is used for etching the magnetic layers 20 and 26 by RIE.

The halogen type gas may be, for example, a gas containing at least either of $Cl_2$ and $BCl_3$.

The carbon compound type gas preferably contains a carbon oxide type gas, in particular. The carbon oxide type gas refers to a gas that contains any of carbon monoxide (CO), carbon dioxide ($CO_2$), tricarbon dioxide ($C_3O_2$), and pentacarbon dioxide ($C_5O_2$). Of these, carbon dioxide is particularly preferable since it is easy to handle. 113 The etching gas may further contain at least either of $O_2$ and $N_2$. The etching gas may be a gas that contains a halogen type gas and air. Air, needless to say, contains $O_2$, $N_2$, and $CO_2$.

Now, qualitative description will be given of the functions of the respective components of the above-mentioned etching gas. The halogen type gas is a chief component contributing to the etching of a magnetic material. The carbon compound type gas increases the etching rate for a magnetic material, or a Co-containing magnetic material in particular. Consequently, the sidewalls of the etched magnetic layer can form an angle closer to 90° with the top surface of the base of the magnetic layer.

The carbon compound type gas decreases the etching rate for alumina. Therefore, when the magnetic layer is made of a Co-containing magnetic material and the etching mask is made of alumina, use of an etching gas containing a carbon compound type gas can enhance the etching selectivity between the magnetic layer and the etching mask as compared to the case of using an etching gas that does not contain a carbon compound type gas. On the other hand, when the base of the magnetic layer is made of alumina and the magnetic layer is made of a Co-containing magnetic material, use of an etching gas containing a carbon compound type gas can enhance the etching selectivity between the magnetic layer and the base as compared to the case of using an etching gas that does not contain a carbon compound type gas. This makes it easy to control termination of the etching of the magnetic layer. The etching selectivity refers to the etching rate for a layer to be etched, divided by the etching rate for the etching mask or that for the base of the layer to be etched.

The carbon compound type gas, as mentioned above, increases the etching rate for a Co-containing magnetic material, in particular. Thus, when the magnetic layer is made of a Co-containing magnetic material and the etching mask is made of a Co-free magnetic material, use of the etching gas containing a carbon compound type gas can also enhance the etching selectivity between the magnetic layer and the etching mask as compared to the case of using an etching gas that does not contain a carbon compound type gas.

$O_2$ and $N_2$ have a function of suppressing undercuts of the magnetic layers 20 and 26. An undercut refers to a state where the layer undergoing the etching is etched particularly heavily at a portion near the border with the etching mask so that the width of the portion becomes smaller than that of the etching mask.

The etching gas in the present embodiment may further contain other components than the above-mentioned ones, such as any of Ar, He, $H_2$, and $CF_4$.

During the etching, the temperature of the layers being etched (magnetic layers 20, 26) is preferably kept at 50° C. or higher for attaining a higher etching rate. During the etching, it is also preferable that the temperature of the layers being etched will not exceed the Curie points of the magnetic materials in the sample including the layers being etched. For example, since NiFe has a Curie point around 700° C., it is preferable that the temperature of the layers being etched should fall within the range of 50 to 700° C. during the etching.

An antiferromagnetic layer in a spin-valve GMR element, if kept above a certain temperature for a long time, can deteriorate in the capability of fixing the direction of magnetization of a pinned layer. That temperature is around 300° C. Consequently, when the sample includes a spin-valve GMR element, it is preferable that the layers being etched should be kept at such a temperature that will allow the temperature of the antiferromagnetic layer to be not higher than 300° C. Meanwhile, during RIE, the surface temperature and the internal temperature of the sample differ from each other, and the difference is around 50° C. Therefore, even if the layers being etched, which lie on the surface of the sample, are around 350° C. in temperature, the antiferromagnetic layer lying inside the sample is around 300° C. in temperature during the etching. Moreover, the etching of the magnetic layers by RIE takes about 3 to 8 minutes of time. Such short-time etching will cause little deterioration in the capability of the antiferromagnetic layer even if the temperature of the layers being etched is around 350° C. Hence, when the sample includes a spin-valve GMR element, it is preferable that the temperature of the layers being etched should fall within the range of 50 to 350° C.

During the etching, it is particularly preferable that the temperature of the layers being etched should fall within the range of 200 to 300° C. By performing the RIE at such a high temperature, when the etching mask is made of a Ni-containing material such as NiFe, Ni molecules that has separated from the etching mask can be prevented from depositing on the sidewalls of the layers being etched.

Figure 20:
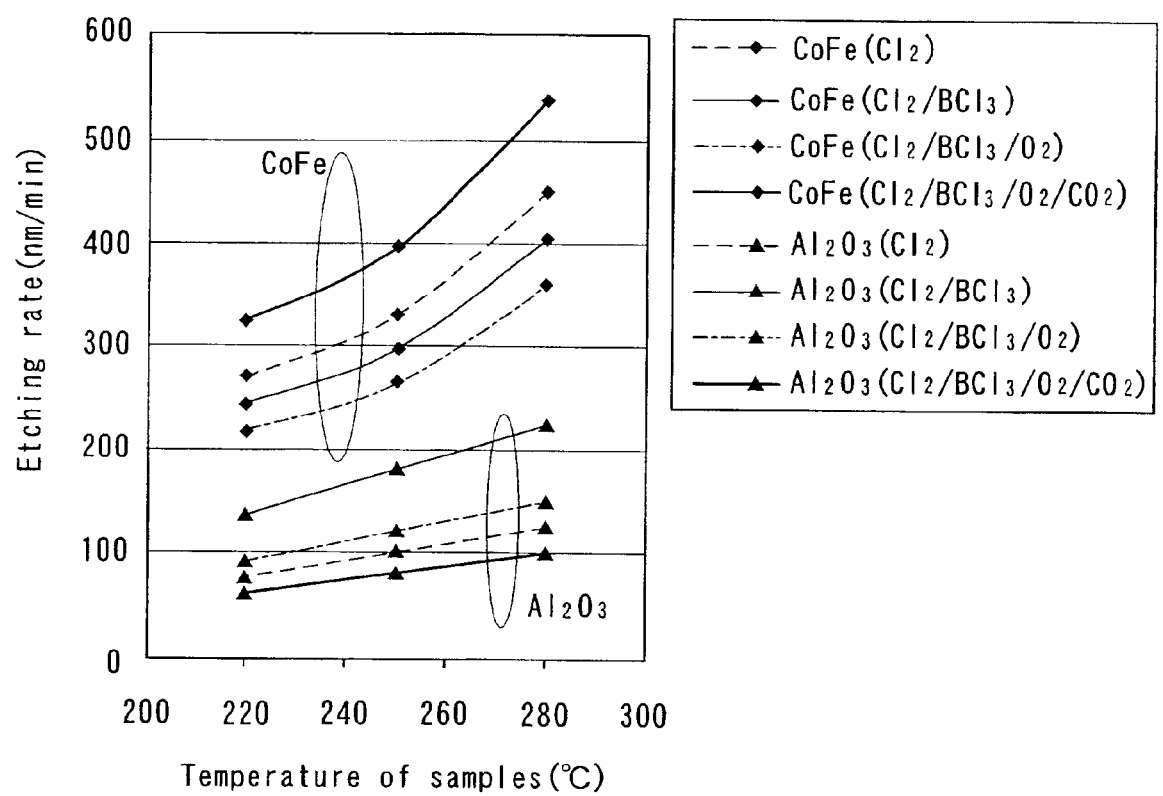
FIG. 20 is a plot illustrating the results of a first experiment that demonstrate the effects of the etching method of the first embodiment of the invention.

Reference is now made to FIG. 20 to describe the results of a first experiment that demonstrate the effects of the etching method of the embodiment. The experiment was conducted using a sample composed of a base and a layer to be etched that is made of CoFe and formed on the base, and a sample composed of a base and a layer to be etched that is made of alumina ($Al_2O_3$) and formed on the base. In the experiment, those layers to be etched were subjected to etching by RIE under various conditions as described below. Then, the relationship between the temperatures of the samples during the etching and the etching rates for the layers being etched was determined. The experiment was conducted for the cases where the etching gas contained $Cl_2$ alone, where the etching gas consisted of $Cl_2$ and $BCl_3$, where the etching gas consisted of $Cl_2$, $BCl_3$ and $O_2$ and where the etching gas consisted of $Cl_2$, $BCl_3$, $O_2$ and $CO_2$. In this experiment, the flow rate of $BCl_3$ was rendered 20% of that of $Cl_2$, the flow rate of $O_2$ was rendered 20% of that of $Cl_2$, and the flow rate of $CO_2$ was rendered 10% of that of $Cl_2$. The experiment was also conducted for each of the cases where the temperatures of the samples under etching were 220° C., 250° C., and 280° C. FIG. 20 shows the results of this experiment. In the legends of the individual lines in FIG. 20, "CoFe" and "$Al_2O_3$" indicate that the layers to be etched are made of CoFe and $Al_2O_3$, respectively. The parenthesized letters show the compositions of the etching gases.

FIG. 20 indicates the following. First, the etching rates increase with increasing temperatures of the samples during the etching, regardless of the material of the layer to be etched and the composition of the etching gas.

Then, when the etching gas consists of $Cl_2$ and $BCl_3$, the etching rate for CoFe is slightly smaller whereas that for $Al_2O_3$ is significantly greater, as compared to the case where the etching gas contains $Cl_2$ alone. Other experiments confirmed this tendency at least when the flow rate of $BCl_3$ was 5 to 20% of the flow rate of $Cl_2$.

When the etching gas consists of $Cl_2$, $BCl_3$ and $O_2$, the etching rate for CoFe is slightly smaller and that for $Al_2O_3$ is significantly smaller, as compared to the case where the etching gas consists of $Cl_2$ and $BCl_3$. From other experiments, it was found that using an $O_2$-containing etching gas in etching the magnetic layer by RIE could suppress undercuts. It was shown from still other experiments that using the etching gas consisting of $Cl_2$, $BCl_3$ and $O_2$ in etching the magnetic layer by RIE could reduce deposits on the sidewalls of the etched magnetic layer to thereby allow a finer etching, as compared to the case where the etching gas contained $Cl_2$ alone. These are the advantages of the etching gas that contains $BCl_3$ and $O_2$ in addition to $Cl_2$. As is clear from FIG. 20, however, the etching gas consisting of $Cl_2$, $BCl_3$ and $O_2$ lowers the etching rate for CoFe as compared to either of the cases where the etching gas contains $Cl_2$ alone and where the etching gas consists of $Cl_2$ and $BCl_3$.

On the other hand, when the etching gas consists of $Cl_2$, $BCl_3$, $O_2$ and $CO_2$, the etching rate for CoFe becomes greater and that for $Al_2O_3$ becomes smaller than in any other cases. Consequently, when RIE is employed for etching the magnetic layer, use of an etching gas consisting of $Cl_2$, $BCl_3$, $O_2$ and $CO_2$ makes it possible to etch the magnetic layer quickly, reduce deposits on the sidewalls of the etched magnetic layer, and attain an angle closer to 90° formed by each of the sidewalls of the etched magnetic layer with the top surface of the base of the magnetic layer. Furthermore, when the magnetic layer is etched by RIE, use of an etching mask made of $Al_2O_3$ and the etching gas consisting of $Cl_2$, $BCl_3$, $O_2$ and $CO_2$ can enhance the etching selectivity between the magnetic layer and the etching mask. In addition, if the base of the magnetic layer is made of $Al_2O_3$, use of the etching gas consisting of $Cl_2$, $BCl_3$, $O_2$ and $CO_2$ can enhance the etching selectivity between the magnetic layer and the base thereof. According to the experiment results shown in FIG. 20, the etching selectivity between the magnetic layer and the etching mask or the base is around 5.0 to 5.5.

Figure 21:
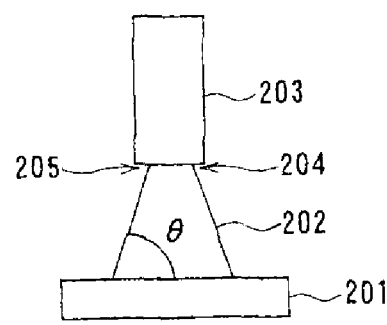
FIG. 21 is an explanatory diagram showing an example of a shape of a layer having undergone etching by RIE.
Figure 22:
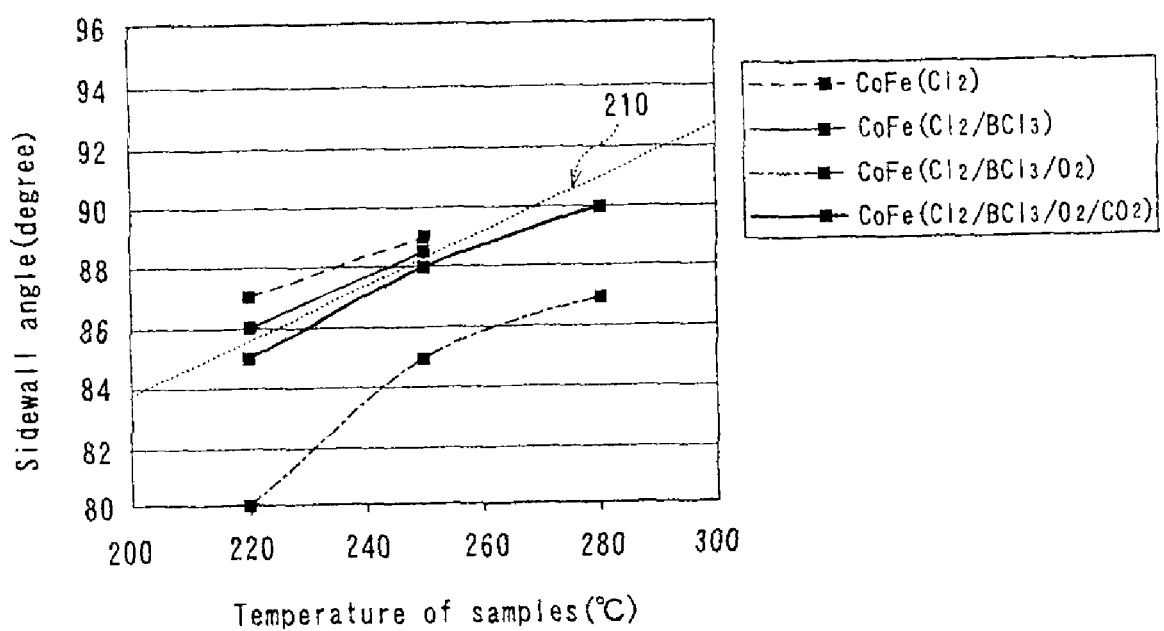
FIG. 22 is a plot illustrating the results of a second experiment that demonstrate the effects of the etching method of the first embodiment of the invention.

Reference is now made to FIGS. 21 and 22 to describe the results of a second experiment that demonstrate the effects of the etching method of the embodiment. This experiment was conducted by using a sample composed of a base and a layer to be etched that is made of CoFe and formed on the base. The layer to be etched was subjected to etching by RIE under various conditions as described below. Then, the relationship between the temperature of the sample during the etching and the angle θ formed by each of the sidewalls of the etched layer with the top surface of the base (hereinafter referred to as a sidewall angle) was determined, and the etched layer was also checked for undercuts.

FIG. 21 shows an example of the shape of a layer having undergone the etching. In this example, a layer 202 having undergone the etching lies on a base 201, and an etching mask 203 is located on the layer 202. In this example, the sidewall angle θ is smaller than 90°. In this example, the layer 202 having undergone the etching suffers undercuts at portions designated by the reference numerals 204 and 205 in FIG. 21.

The second experiment was conducted for the cases where the etching gas contained $Cl_2$ alone, where the etching gas consisted of $Cl_2$ and $BCl_3$, where the etching gas consisted of $Cl_2$, $BCl_3$ and $O_2$, and where the etching gas consisted of $Cl_2$, $BCl_3$, $O_2$, and $CO_2$. In the second experiment, the flow rate of $BCl_3$, the flow rate of $O_2$, the flow rate of $CO_2$, and the temperatures of the sample during the etching were the same as in the first experiment. FIG. 22 shows the results of the second experiment. The legends of the individual lines in FIG. 22 have the same meanings as those of FIG. 20.

The results of the second experiment show that the samples corresponding to the points that fall in the region above the dotted line designated by the reference numeral 210 in FIG. 22 suffered undercuts, whereas the samples corresponding to the points that fall in the region below the dotted line were free of undercuts.

FIG. 22 indicates the following. First, the sidewall angle θ becomes closer to 90° with increasing temperature of the samples during etching, regardless of the composition of the etching gas.

When the etching gas contains $Cl_2$ alone and when the etching gas consists of $Cl_2$ and $BCl_3$, the sidewall angle θ approaches 90°, but with undercuts. When the etching gas consists of $Cl_2$, $BCl_3$ and $O_2$, no undercuts develop while the sidewall angle θ diverges from 90° more widely than in the other cases.

When the etching gas consists of $Cl_2$, $BCl_3$, $O_2$ and $CO_2$, the sidewall angle θ approaches 90° with no undercuts. In this case, it is therefore possible to precisely control the post-etching profiles of the layers etched (magnetic layers).

As has been described, in the present embodiment, the magnetic layer 20 is etched by RIE using the etching gas containing a halogen type gas and a carbon compound type gas, thereby forming the third layer 10d of the bottom pole layer 10. Besides, the magnetic layer 26 is etched by RIE in the same manner to form the first layer 27a of the top pole layer 27. The etching method of the embodiment makes it possible to etch the magnetic layers 20 and 26 in a short time and to precisely control the profiles of the layers 10d and 27a that are made of the etched magnetic layers 20 and 26, respectively.

According to the embodiment, it is also possible to attain a higher etching selectivity between the magnetic layers 20, 26 and the etching mask or the base in the etching of the magnetic layers 20 and 26. For example, when the magnetic layer 20 is made of a Co-containing magnetic material, use of a Co-free magnetic material for the etching mask 21a can provide an etching selectivity on the order of 1.5 to 3.0 between the magnetic layer 20 and the etching mask 21a. When the etching mask 21a is made of alumina, still higher etching selectivity is attainable.

Similarly, when the magnetic layer 26 is made of a Co-containing magnetic material, use of a Co-free magnetic material for the second layer 27b serving as the etching mask can provide an etching selectivity on the order of 1.5 to 3.0 between the magnetic layer 26 and the etching mask.

When the recording gap layer 25, which is the base of the magnetic layer 26, is made of alumina and the magnetic layer 26 is made of a Co-containing magnetic material, an etching selectivity between the magnetic layer 26 and the base is enhanced. This makes it easy to control termination of the etching of the magnetic layer 26.

In the embodiment, the track width defining portion 27A of the top pole layer 27 defines the recording track width. Therefore, the track width defining portion 27A must be formed finely with high precision. The initial width of the track width defining portion 27A is 0.1 to 0.2 μm, for example. To form the track width defining portion 27A finely with high precision, it is necessary that the second layer 27b, which serves as the etching mask for etching the magnetic layer 26, be formed finely with high precision, too. It is also necessary that a frame for forming the second layer 27b by frame plating be formed finely with high precision.

According to the embodiment, as described above, it is possible to enhance the etching selectivity in the etching of the magnetic layer 26. The second layer 27b serving as the etching mask may thus be as thin as 1 to 2 μm or so.

Consequently, the frame to be used for forming the second layer 27b may also be as thin as 1.8 to 2.8 µm, for example. The frame of such a thickness having an opening which is 0.1 to 0.2 µm or so in width can be formed precisely by photolithography. Hence, according to the embodiment, it is possible to form the track width defining portion 27A finely with high precision.

In the embodiment, after the track width defining portion 27A is formed by RIE, the sidewalls of the track width defining portion 27A are etched by ion beam etching, for example, so that the track width defining portion 27A has a width of 0.1 µm, for example. Thus, according to the embodiment, the track width defining portion 27A can be reduced in width.

For the track width defining portion 27A, it is particularly important that the first layer 27a that touches the recording gap layer 25 be precisely defined in shape. The above-mentioned etching of the sidewalls of the track width defining portion 27A is intended only to reduce the width of the track width defining portion 27A by 0.05 µm or so. Besides, the second layer 27b lies over the first layer 27a. Consequently, the etching of the sidewalls of the track width defining portion 27A simply reduces the width of the first layer 27a, and cannot decrease the thickness of the first layer 27a or make the first layer 27a thinner at a portion near the top surface thereof than a portion near the recording gap layer 25.

On the other hand, after formation of the track with defining portion 27A by RIE, the track width defining portion 27A can possibly be corroded if molecules of the halogen type gas used in the RIE adhere to the sidewalls of the track width defining portion 27A. According to the embodiment, however, even if molecules of the halogen type gas adhere to the sidewalls of the track width defining portion 27A, the sidewalls can be etched by ion beam etching to remove the molecules of the halogen type gas from the sidewalls. As a result, the track with defining portion 27A can be protected from corrosion.

In the embodiment, etching of the third layer 10d of the bottom pole layer 10 for the purpose of forming the trim structure may be performed by the same etching method as that for the magnetic layers 20 and 26. In this case, it is possible to etch the third layer 10d in a short time and to precisely control the post-etching profile of the third layer 10d. Furthermore, in the etching of the third layer 10d, a higher etching selectivity is attained between the third layer 10d and the second layer 27b that is the top layer of the etching mask.

In the embodiment, the third layer 10d of the bottom pole layer 10 and the first layer 27a of the top pole layer 27 may be made of a high saturation flux density material. In the embodiment, when these layers are made of a Co-containing high saturation flux density material, in particular, the afore-mentioned advantageous effects of the etching method of the embodiment become significant.

As shown above, according to the embodiment, magnetic pole portions of small width can be formed with high precision by using a high saturation flux density material. According to the embodiment, it is therefore possible to reduce the recording track width to about 0.1 to 0.2 µm while preventing saturation of the magnetic flux passing through the pole layers 10 and 27 before it reaches the air bearing surface 30. Consequently, the embodiment makes it possible to manufacture a thin-film magnetic head having a small recording track width and excellent recording characteristics including the overwrite property and nonlinear transition shift.

[Second Embodiment]

Reference is now made to FIGS. 23A to 34A and FIGS. 23B to 34B to describe a method of manufacturing a thin-film magnetic head and a method of etching a magnetic material film according to a second embodiment of the invention. FIGS. 23A to 34A are cross sections each orthogonal to the air bearing surface and the top surface of the substrate. FIGS. 23B to 34B are cross sections of the magnetic pole portion each parallel to the air bearing surface.

The manufacturing method of the present embodiment is the same as that of the first embodiment up to the step of forming the intercoil insulating film 14.

Then, in the present embodiment, as shown in FIGS. 23A and 23B, a first conductive film made of Cu, for example, is formed to a thickness of, e.g., 50 nm by sputtering, for example, so as to cover the entire top surface of the laminate. On the first conductive film, a second conductive film made of Cu, for example, is formed by CVD to a thickness of 80 nm, for example. The second conductive film is not intended to fill the grooves between the turns of the first thin-film coil 13, but formed to cover the grooves by making use of the excellent step coverage of CVD. The two conductive films mentioned above will be referred to collectively as an electrode film 41. The electrode film 41 functions as an electrode and a seed layer for plating. On the electrode film 41, the conductive layer 18p made of Cu, for example, is formed by plating to a thickness of 2 to 3 µm, for example.

Next, as shown in FIGS. 24A and 24B, an insulating layer 42 made of alumina, for example, is formed to a thickness of 3 to 4 µm so as to cover the entire top surface of the laminate.

Next, as shown in FIGS. 25A and 25B, the conductive layer 18p is polished by CMP, for example, so that the second layer 10b, the coupling layer 10c and the first thin-film coil 13 are exposed. As a result, the conductive layer 18p remaining in the grooves between the turns of the first thin-film coil 13 makes the second thin-film coil 18. The polishing mentioned above is performed so that the first thin-film coil 13 and the second thin-film coil 18 each have a thickness of 2.0 to 2.5 µm, for example. Although not shown, the second thin-film coil 18 is connected to the first thin-film coil 13 such that a contiguous winding is formed by the thin-film coils 13 and 18. In FIG. 25A, the reference numeral 18a represents a connecting portion of the second thin-film coil 18 that is to be connected to a lead layer described later.

Next, as shown in FIGS. 26A and 26B, the coil coat insulating film 19 made of alumina, for example, is formed to a thickness of 0.1 to 0.3 µm to cover the entire top surface of the laminate. Then, the coil coat insulating film 19 is selectively etched to remove portions thereof corresponding to the second layer 10b, the coupling layer 10c, the connecting portion 13a of the first thin-film coil 13, and the connecting portion 18a of the second thin-film coil 18. The coil coat insulating film 19 after the etching covers the top surfaces of the thin-film coils 13 and 18 except for the connecting portion 13a of the first thin-film coil 13 and the connecting portion 18a of the second thin-film coil 18.

Next, the magnetic layer 20 of a magnetic material is formed to a thickness of 0.8 to 1.2 µm by sputtering, so as to cover the entire top surface of the laminate. The material of the magnetic layer 20 is the same as in the first embodiment.

Next, CMP stopper films 43a, 43b, 43c and 43d, each made of Ta or Ti, for example, and each having a thickness of 10 to 20 nm, are formed on the magnetic layer 20 at portions corresponding to the second layer 10*b*, the coupling layer 10*c*, the connecting portion 13*a* of the first thin-film coil 13, and the connecting portion 18*a* of the second thin-film coil 18, respectively. Then, on the CMP stopper films 43*a*, 43*b*, 43*c*, and 43*d* having a thickness of 10 to 20 nm, the etching masks 21*a*, 21*b*, 21*c* and 21*d* are formed respectively, to a thickness of 1 to 2 $\mu$m each.

The CMP stopper films 43*a* to 43*d* are formed by sputtering, for example. The material and forming method of the masks 21*a* to 21*d* are the same as in the first embodiment.

Next, as shown in FIGS. 27A and 27B, the magnetic layer 20 is etched by RIE using the masks 21*a* to 21*d*. Portions of the magnetic layer 20 remaining under the CMP stopper films 43*a* to 43*d* after the etching make the third layer 10*d*, the coupling layer 10*e*, a connecting layer 22*a*, and a connecting layer 23*a*, respectively. The method of etching the magnetic layer 20 by RIE is the same as in the first embodiment.

Next, as shown in FIGS. 28A and 28B, the insulating layer 24 made of alumina, for example, is formed to a thickness of 1.5 to 2.0 $\mu$m so as to cover the entire top surface of the laminate. Then, the insulating layer 24 is polished by CMP so as to remove the masks 21*a* to 21*d* and the CMP stopper films 43*a* to 43*d*, and to flatten the top surfaces of the third layer 10*d*, the coupling layer 110*e*, the connecting layers 22*a* and 23*a*, and the insulating layer 24. At this time, a position to stop the CMP is determined by using the CMP stopper films 43*a* to 43*d*.

Next, as shown in FIGS. 29A and 29B, the recording gap layer 25 made of an insulating material such as alumina is formed to a thickness of 0.08 to 0.1 $\mu$m so as to cover the entire top surface of the laminate.

Next, as shown in FIGS. 30A and 30B, portions of the recording gap layer 25 corresponding to the coupling layer 10*e* and the connecting layers 22*a*, 23*a* are selectively etched.

Next, the magnetic layer 26 of a magnetic material is formed by sputtering, for example, to a thickness of 0.5 to 1.0 $\mu$m so as to cover the entire top surface of the laminate. The magnetic layer 26 is made of the same material as in the first embodiment.

Next, the second layer 27*b* of the top pole layer 27 and the lead layers 22*c*, 23*c* are formed by frame plating, for example, on the magnetic layer 26 to a thickness of 1 to 2 $\mu$m, for example. The materials and arrangement of the second layer 27*b* and the lead layers 22*c*, 23*c* are the same as in the first embodiment.

Next, as shown in FIGS. 31A and 31B, the magnetic layer 26 is selectively etched by RIE using the second layer 27*b* and the lead layers 22*c*, 23*c* as etching masks. Consequently, portions of the magnetic layer 26 remaining after the etching make the first layer 27*a* of the top pole layer 27 and the lead layers 22*b*, 23*b*. The lead layer 22*b* is located under the lead layer 22*c*, and the lead layer 23*b* under the lead layer 23*c*. The method of etching the magnetic layer 26 by RIE is the same as in the first embodiment.

As in the first embodiment, the top pole layer 27 has the first layer 27*a* and the second layer 27*b*. The top pole layer 27 also includes the track width defining portion 27A and the yoke portion 27B. When forming the first layer 27*a* by RIE, the track width defining portion 27A is given an initial width on the order of 0.1 to 0.2 $\mu$m.

Next, as shown in FIGS. 32A and 32B, the sidewalls of the track width defining portion 27A of the top pole layer 27 are etched by ion beam etching, for example, so that the width of the track width defining portion 27A is made 0.1 $\mu$m, for example. This etching is performed in the same way as in the first embodiment.

Figure 33A:
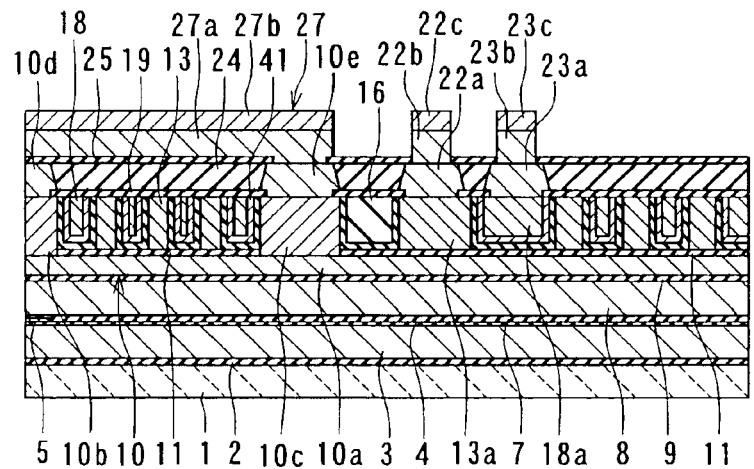
FIGS. 33A and 33B are cross sections for illustrating a step that follows FIGS. 32A and 32B.
Figure 33B:
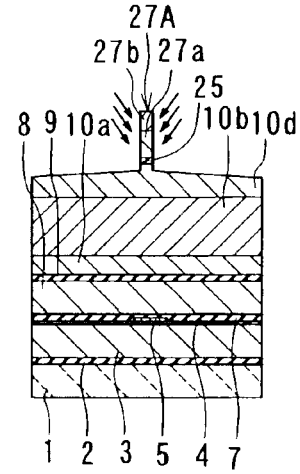

Next, although not shown, a photoresist mask having an opening around the track width defining portion 27A is formed. As shown in FIGS. 33A and 33B, the recording gap layer 25 around the track width defining portion 27A is etched, for example, by RIE with a mixed gas of Cl$_2$ and BCl$_3$ as the etching gas, using the above-mentioned photoresist mask and the top pole layer 27 as masks.

Next, the above-mentioned photoresist mask and the top pole layer 27 are used as masks to etch part of the third layer 10*d* of the bottom pole layer 10 at around the track width defining portion 27A by ion beam etching, for example. This etching is performed in the same way as in the first embodiment. A trim structure as shown in FIG. 33B is thereby formed.

Figure 34A:
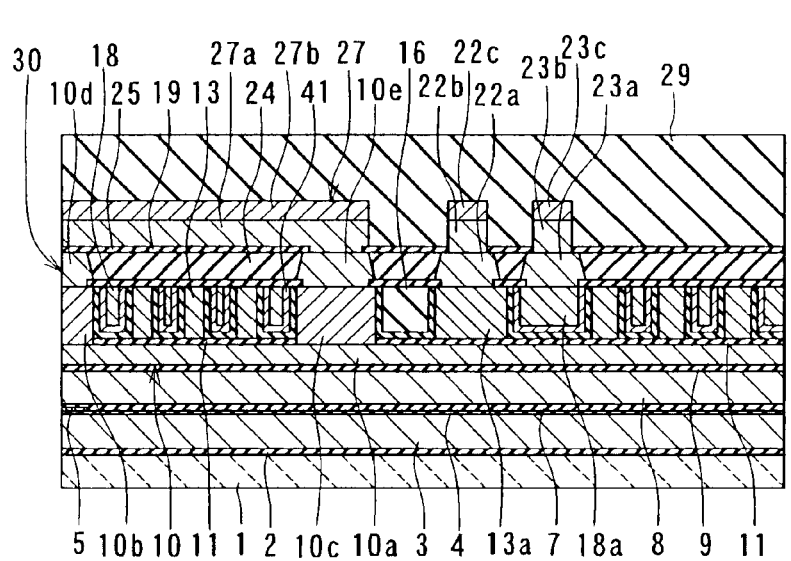
FIGS. 34A and 34B are cross sections for illustrating a step that follows FIGS. 33A and 33B.
Figure 34B:
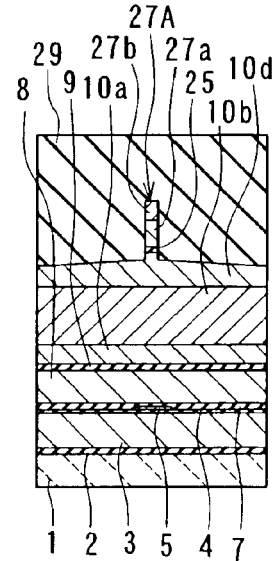

Next, as shown in FIGS. 34A and 34B, the overcoat layer 29 made of alumina, for example, is formed to a thickness of 20 to 30 $\mu$m so as to cover the entire top surface of the laminate. The surface is flattened, and not-shown electrode pads are formed thereon. Finally, lapping of the slider including the foregoing layers is performed to form the air bearing surface 30 of the recording and reproducing heads. The thin-film magnetic head is thereby completed.

The remainder of the configuration, functions and effects of the present embodiment are the same as those of the first embodiment.

[Third Embodiment]

Reference is now made to FIGS. 35A to 45A and FIGS. 35B to 45B to describe a method of manufacturing a thin-film magnetic head and a method of etching a magnetic material film according to a third embodiment of the invention. FIGS. 35A to 45A are cross sections each orthogonal to the air bearing surface and the top surface of the substrate. FIGS. 35B to 45B are cross sections of the magnetic pole portion each parallel to the air bearing surface.

The manufacturing method according to the embodiment is the same as that of the first embodiment up to the step of forming the insulating film 11 on the first layer 10*a* and forming openings in the insulating film 11.

Then, in the present embodiment, although not shown, an electrode film of a conductive material is formed to a thickness of 50 to 80 nm by sputtering, for example, so as to cover the first layer 10*a* and the insulating film 11. This electrode film functions as an electrode and a seed layer for plating. Then, although not shown, a frame to be used for forming a thin-film coil 51 by frame plating is formed on the electrode film by photolithography.

Then, as shown in FIGS. 35A and 35B, electroplating is performed using the electrode film, to form the thin-film coil 51 of Cu, for example, to a thickness of approximately 2.2 to 2.7 $\mu$m. The thin-film coil 51 is disposed within the region where the insulating film 11 lies. In FIG. 35A, the reference numeral 51*a* represents a connecting portion of the thin-film coil 51 that is to be connected to a lead layer described later. Then, the electrode film except for a portion thereof underlying the thin-film coil 51 is removed by ion beam etching, for example.

Then, although not shown, a frame to be used for forming the second layer 10*b* and the coupling layer 10*c* by frame plating is formed on the first layer 10*a* and the insulating film 11 by photolithography.

Next, as shown in FIGS. 36A and 36B, electroplating is performed to form the second layer 10*b* and the coupling layer 10*c*, each made of a magnetic material and having a thickness of 2 to 3 $\mu$m, for example, on the first layer 10*a*. The materials of the second layer 10*b* and the coupling layer 10*c* are the same as those in the first embodiment.

Next, although not shown, a photoresist layer is formed to cover the thin-film coil 51, the second layer 10b and the coupling layer 10c. Using the photoresist layer as a mask, the first layer 10a is selectively etched by ion beam etching, for example, to thereby pattern the first layer 10a.

Next, an insulating layer 52 made of photoresist, for example, is formed to fill at least a space between turns of the thin-film coil 51. Part of the insulating layer 52 is disposed outside the outer periphery of the thin-film coil 51 and inside the inner periphery of the same. Then, an insulating layer 53 made of alumina, for example, is formed to a thickness of 3 to 4 $\mu$m so as to cover the entire top surface of the laminate.

Next, as shown in FIGS. 37A and 37B, the insulating layer 53 is polished by CMP, for example, to expose the second layer 10b, the coupling layer 10c and the thin-film coil 51. This polishing is performed so that the second layer 10b, the coupling layer 10c and the thin-film coil 51 each have a thickness of 2.0 to 2.5 $\mu$m, for example.

Next, as shown in FIGS. 38A and 38B, the coil coat insulating film 19 made of alumina, for example, is formed to a thickness of 0.1 to 0.3 $\mu$m so as to cover the entire top surface of the laminate. Then, the coil coat insulating film 19 is selectively etched to remove portions thereof corresponding to the second layer 10b, the coupling layer 10c and the connecting portion 51a of the thin-film coil 51. The coil coat insulating film 19 after the etching covers the top surface of the thin-film coil 51 except for the connecting portion 51a of the thin-film coil 51.

Next, the magnetic layer 20 of a magnetic material is formed to a thickness of 0.8 to 1.2 $\mu$m by sputtering, so as to cover the entire top surface of the laminate. The material of the magnetic layer 20 is the same as in the first embodiment.

Next, etching masks 54a, 54b and 54c are formed to a thickness of 1 to 2 $\mu$m each on the magnetic layer 20 at the portions corresponding to the second layer 10b, the coupling layer 10c and the connecting portion 51a of the thin-film coil 51, respectively. The material and the method of forming the masks 54a to 54c are the same as those of the masks 21a to 21d in the first embodiment.

Next, as shown in FIGS. 39A and 39B, the magnetic layer 20 is etched by RIE using the masks 54a to 54c. Portions of the magnetic layer 20 remaining under the masks 54a to 54c after the etching make the third layer 10d, the coupling layer 10e, and a connecting layer 55a, respectively. The connecting layer 55a is located on the connecting portion 51a. The method of etching the magnetic layer 20 by RIE is the same as in the first embodiment.

Next, as shown in FIGS. 40A and 40B, the insulating layer 24 made of alumina, for example, is formed to a thickness of 1.5 to 2.0 $\mu$m so as to cover the entire top surface of the laminate.

Next, as shown in FIGS. 41A and 41B, the insulating layer 24 is polished by CMP so as to remove the masks 54a to 54c and to flatten the top surfaces of the third layer 10d, the coupling layer 10e, the connecting layer 55a and the insulating layer 24.

Next, as shown in FIGS. 42A and 42B, the recording gap layer 25 of an insulating material such as alumina is formed to a thickness of 0.08 to 0.1 $\mu$m so as to cover the entire top surface of the laminate. Then, portions of the recording gap layer 25 corresponding to the coupling layer 10e and the connecting layer 55a are selectively etched.

Next, the magnetic layer 26 of a magnetic material is formed by sputtering, for example, to a thickness of 0.5 to 1.0 $\mu$m so as to cover the entire top surface of the laminate.

The material of the magnetic layer 26 is the same as that in the first embodiment. Next, the second layer 27b of the top pole layer 27 and a lead layer 55c are formed to a thickness of 1 to 2 $\mu$m on the magnetic layer 26 by frame plating, for example. The material and the location of the second layer 27b are the same as those in the first embodiment. The lead layer 55c is made of the same material as that of the second layer 27b. The lead layer 55c extends from a position corresponding to the connecting layer 55a.

Next, the magnetic layer 26 is selectively etched by RIE using the second layer 27b and the lead layer 55c as etching masks. Consequently, portions of the magnetic layer 26 remaining after the etching make the first layer 27a of the top pole layer 27 and a lead layer 55b. The lead layer 55b is located under the lead layer 55c. The method of etching the magnetic layer 26 by RIE is the same as in the first embodiment.

As in the first embodiment, the top pole layer 27 has the first layer 27a and the second layer 27b. The top pole layer 27 also includes the track width defining portion 27A and the yoke portion 27B. When forming the first layer 27a by RIE, the track width defining portion 27A is given an initial width on the order of 0.1 to 0.2 $\mu$m.

Next, as shown in FIGS. 43A and 43B, the sidewalls of the track width defining portion 27A of the top pole layer 27 are etched by ion beam etching, for example, so that the width of the track width defining portion 27A is made 0.1 $\mu$m, for example. This etching is performed in the same way as in the first embodiment.

Next, although not shown, a photoresist mask having an opening around the track width defining portion 27A is formed. Then, as shown in FIGS. 44A and 44B, the recording gap layer 25 around the track width defining portion 27A is etched, for example, by RIE with a mixed gas of $Cl_2$ and $BCl_3$ as the etching gas, using the above-mentioned photoresist mask and the top pole layer 27 as masks.

Next, the above-mentioned photoresist mask and the top pole layer 27 are used as masks to etch part of the third layer 10d of the bottom pole layer 10 at around the track width defining portion 27A by ion beam etching, for example. This etching is performed in the same way as in the first embodiment. A trim structure as shown in FIG. 44B is thereby formed.

Next, as shown in FIGS. 45A and 45B, the overcoat layer 29 made of alumina, for example, is formed to a thickness of 20 to 30 $\mu$m so as to cover the entire top surface of the laminate. The surface is flattened, and not-shown electrode pads are formed thereon. Finally, lapping of the slider including the foregoing layers is performed to form the air bearing surface 30 of the recording and reproducing heads. The thin-film magnetic head is thereby completed.

The remainder of the configuration, functions and effects of the present embodiment are the same as those of the first embodiment.

[Fourth Embodiment]

Reference is now made to FIGS. 46A to 56A and FIGS. 46B to 56B to describe a method of manufacturing a thin-film magnetic head and a method of etching a magnetic material film according to a fourth embodiment of the invention. FIGS. 46A to 56A are cross sections each orthogonal to the air bearing surface and the top surface of the substrate. FIGS. 46B to 56B are cross sections of the magnetic pole portion each parallel to the air bearing surface.

The manufacturing method according to the embodiment is the same as that of the first embodiment up to the step of forming the first layer 10a. Then, in the present embodiment, although not shown, a frame to be used for forming the second layer 10b and the coupling layer 10c by frame plating is formed on the first layer 10a and the insulating film 11 by photolithography.

Next, as shown in FIGS. 46A and 46B, electroplating is performed to form the second layer 10b and the coupling layer 10c, each made of a magnetic material and having a thickness of 2 to 3 μm, for example, on the first layer 10a. In the embodiment, the second layer 10b and the coupling layer 10c are formed by plating without any special electrode film, but using the unpatterned first layer 10a as an electrode and a seed layer for plating. The materials of the second layer 10b and the coupling layer 10c are the same as those in the first embodiment.

Next, an insulating film 61 made of alumina, for example, is formed to a thickness of 0.1 to 0.3 μm so as to cover the entire top surface of the laminate. The insulating film 61 may be made by sputtering or by the same method as that for the insulating film 14 in the first embodiment.

Next, although not shown, an electrode film made of Cu, for example, is formed to a thickness of 50 to 80 nm by sputtering, for example, so as to cover the entire top surface of the laminate. Then, although not shown, a frame to be used for forming a thin-film coil by frame plating is formed on the electrode film by photolithography.

Next, electroplating is performed using the electrode film, to form a thin-film coil 62 made of Cu, for example, to a thickness of approximately 2.2 to 2.7 μm. In FIG. 46A, the reference numeral 62a represents a connecting portion of the thin-film coil 62 that is to be connected to a lead layer described later. Then, the electrode film except for a portion thereof underlying the thin-film coil 62 is removed by ion beam etching, for example.

Next, although not shown, a photoresist layer is formed to cover the second layer 10b, the coupling layer 10c and the thin-film coil 62. Using the photoresist layer as a mask, the first layer 10a is selectively etched by ion beam etching, for example, to thereby pattern the first layer 10a.

Next, as shown in FIGS. 47A and 47B, an insulating layer 63 made of photoresist, for example, is formed to fill at least a space between turns of the thin-film coil 62. Part of the insulating layer 63 is disposed outside the outer periphery of the thin-film coil 62 and inside the inner periphery of the same. Then, an insulating layer 64 made of alumina, for example, is formed to a thickness of 3 to 4 μm so as to cover the entire top surface of the laminate.

Next, as shown in FIGS. 48A and 48B, the insulating layer 64 is polished by CMP, for example, to expose the second layer 10b, the coupling layer 10c and the thin-film coil 62. This polishing is performed so that the second layer 10b, the coupling layer 10c and the thin-film coil 62 each have a thickness of 2.0 to 2.5 μm, for example.

Next, as shown in FIGS. 49A and 49B, the coil coat insulating film 19 made of alumina, for example, is formed to a thickness of 0.1 to 0.3 μm to cover the entire top surface of the laminate. Then, the coil coat insulating film 19 is selectively etched to remove portions thereof corresponding to the second layer 10b, the coupling layer 10c and the connecting portion 62a of the thin-film coil 62. The coil coat insulating film 19 after the etching covers the top surface of the thin-film coil 62 except for the connecting portion 62a of the thin-film coil 62.

Next, the magnetic layer 20 of a magnetic material is formed to a thickness of 0.8 to 1.2 μm by sputtering, so as to cover the entire top surface of the laminate. The material of the magnetic layer 20 is the same as in the first embodiment.

Next, etching masks 64a, 64b and 64c are formed to a thickness of 1 to 2 μm each on the magnetic layer 20 at the portions corresponding to the second layer 10b, the coupling layer 10c and the connecting portion 62a of the thin-film coil 62, respectively. The material and the method of forming the masks 64a to 64c are the same as those of the masks 21a to 21d in the first embodiment.

Next, as shown in FIGS. 50A and 50B, the magnetic layer 20 is etched by RIE using the masks 64a to 64c. Portions of the magnetic layer 20 remaining under the masks 64a to 64c after the etching make the third layer 10d, the coupling layer 10e, and a connecting layer 65a, respectively. The connecting layer 65a is located on the connecting portion 62a. The method of etching the magnetic layer 20 by RIE is the same as in the first embodiment.

Next, as shown in FIGS. 51A and 51B, the insulating layer 24 made of alumina, for example, is formed to a thickness of 1.5 to 2.0 μm so as to cover the entire top surface of the laminate.

Next, as shown in FIGS. 52A and 52B, the insulating layer 24 is polished by CMP so as to remove the masks 64a to 64c and to flatten the top surfaces of the third layer 10d, the coupling layer 10e, the connecting layer 65a and the insulating layer 24.

Figure 53A:
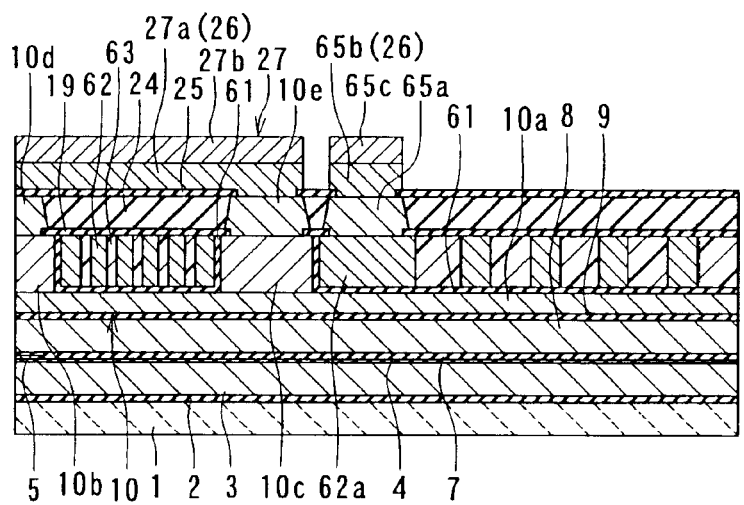
FIGS. 53A and 53B are cross sections for illustrating a step that follows FIGS. 52A and 52B.
Figure 53B:
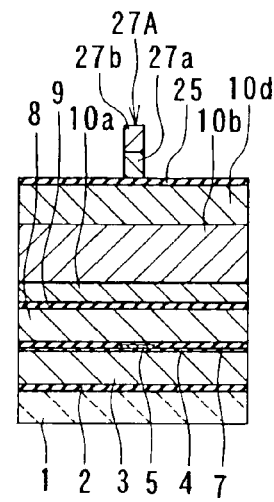

Next, as shown in FIGS. 53A and 53B, the recording gap layer 25 of an insulating material such as alumina is formed to a thickness of 0.08 to 0.1 μm so as to cover the entire top surface of the laminate. Then, portions of the recording gap layer 25 corresponding to the coupling layer 10e and the connecting layer 65a are selectively etched.

Next, the magnetic layer 26 of a magnetic material is formed by sputtering, for example, to a thickness of 0.5 to 1.0 μm so as to cover the entire top surface of the laminate. The material of the magnetic layer 26 is the same as that in the first embodiment. Next, on the magnetic layer 26, the second layer 27b of the top pole layer 27 and a lead layer 65c are formed to a thickness of 1 to 2 μm by frame plating, for example. The material and the location of the second layer 27b are the same as those in the first embodiment. The lead layer 65c is made of the same material as that of the second layer 27b. The lead layer 65c extends from a position corresponding to the connecting layer 65a.

Next, the magnetic layer 26 is selectively etched by RIE using the second layer 27b and the lead layer 65c as etching masks. Consequently, portions of the magnetic layer 26 remaining after the etching make the first layer 27a of the top pole layer 27 and a lead layer 65b. The lead layer 65b is located under the lead layer 65c. The method of etching the magnetic layer 26 by RIE is the same as in the first embodiment.

As in the first embodiment, the top pole layer 27 has the first layer 27a and the second layer 27b. The top pole layer 27 also includes the track width defining portion 27A and the yoke portion 27B. When forming the first layer 27a by RIE, the track width defining portion 27A is given an initial width on the order of 0.1 to 0.2 μm.

Figure 54A:
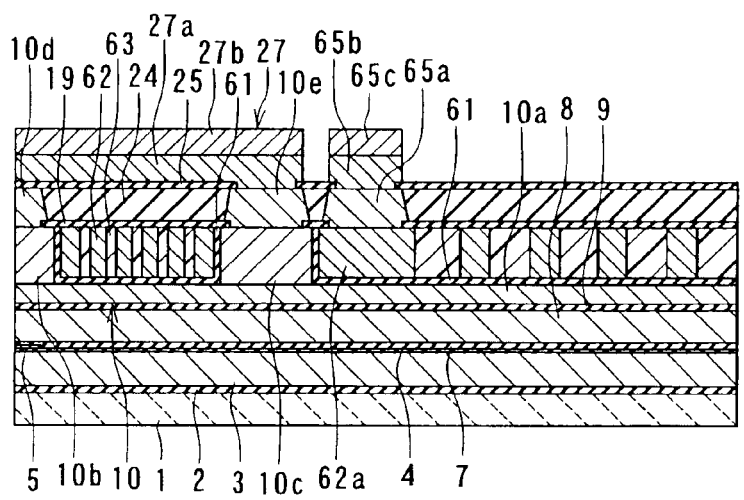
FIGS. 54A and 54B are cross sections for illustrating a step that follows FIGS. 53A and 53B.
Figure 54B:
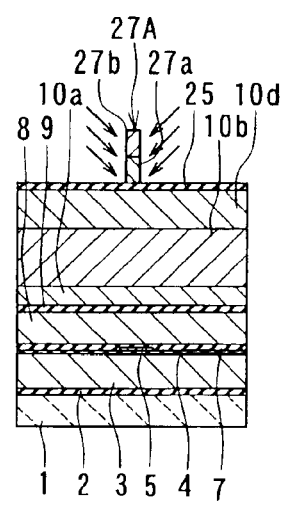
Figures 61A, 61B:
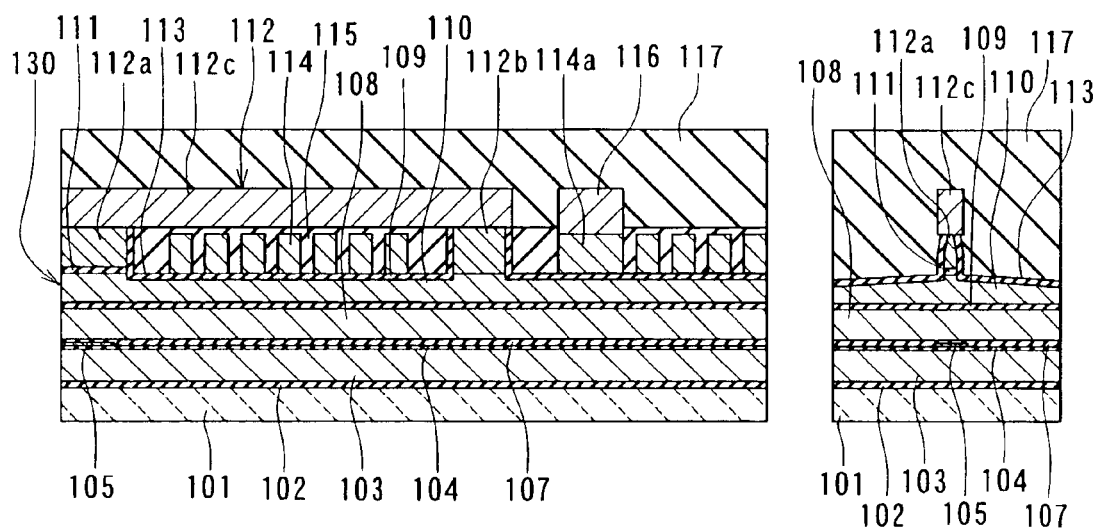
FIGS. 61A and 61B are cross sections for illustrating a step that follows FIGS. 60A and 60B.
Figure 62:
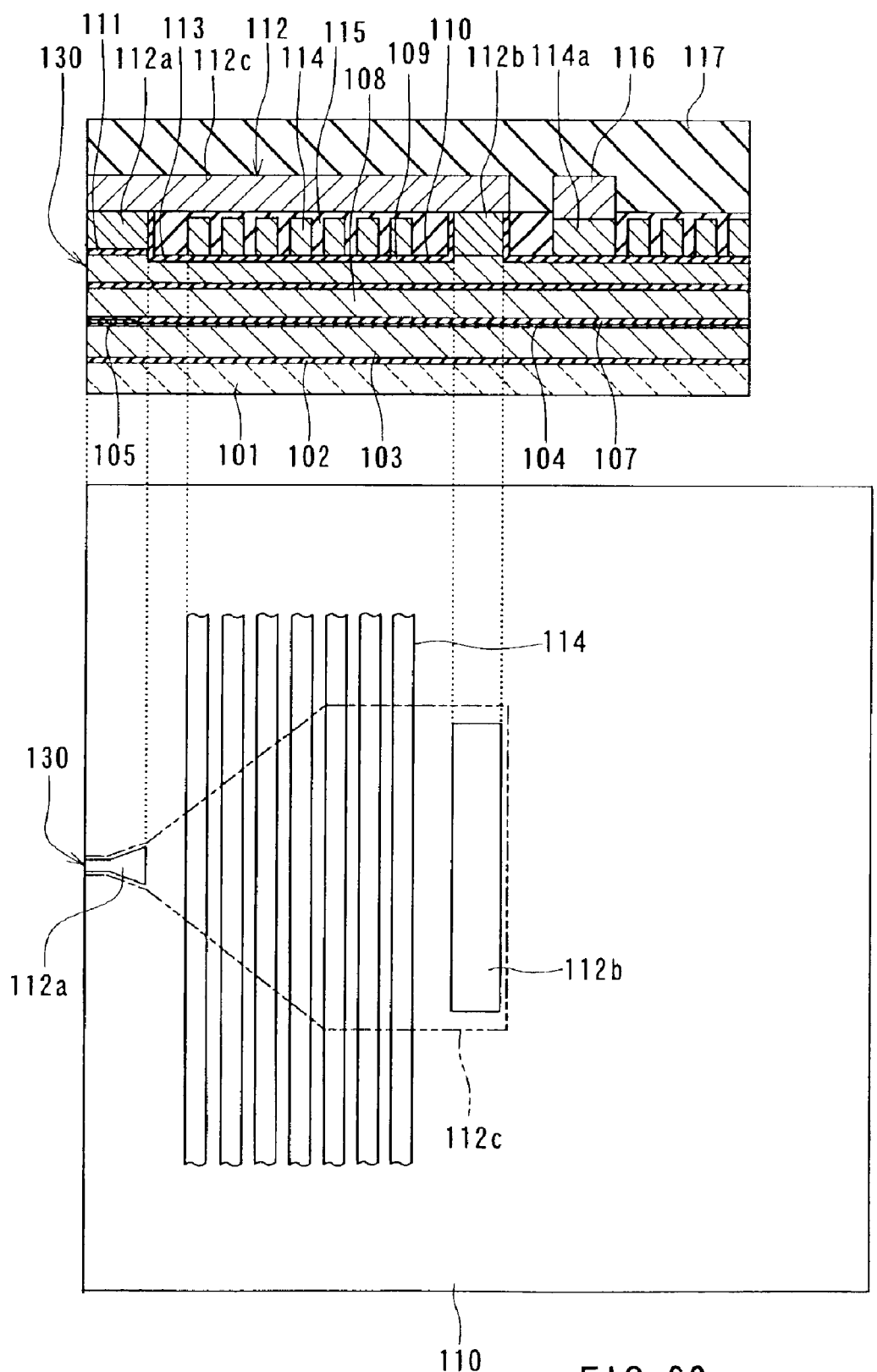
FIG. 62 is an explanatory view showing the thin-film magnetic head of the related art.

Next, as shown in FIGS. 54A and 54B, the sidewalls of the track width defining portion 27A of the top pole layer 27 are etched by ion beam etching, for example, so that the width of the track width defining portion 27A is made 0.1 μm, for example. This etching is performed in the same way as in the first embodiment.

Next, although not shown, a photoresist mask having an opening around the track width defining portion 27A is formed. Then, as shown in FIGS. 55A and 55B, the recording gap layer 25 around the track width defining portion 27A is etched, for example, by RIE with a mixed gas of Cl₂ and BCl₃ as the etching gas, using the above-mentioned photoresist mask and the top pole layer 27 as masks.

Next, the above-mentioned photoresist mask and the top pole layer 27 are used as masks to etch part of the third layer 10d of the bottom pole layer 10 at around the track width defining portion 27A by ion beam etching, for example. This etching is performed in the same way as in the first embodiment. A trim structure as shown in FIG. 55B is thereby formed.

Next, as shown in FIGS. 56A and 56B, the overcoat layer 29 made of alumina, for example, is formed to a thickness of 20 to 30 $\mu$m so as to cover the entire top surface of the laminate. The surface is flattened, and not-shown electrode pads are formed thereon. Finally, lapping of the slider including the foregoing layers is performed to form the air bearing surface 30 of the recording and reproducing heads. The thin-film magnetic head is thereby completed.

The remainder of the configuration, functions and effects of the present embodiment are the same as those of the first embodiment.

The present invention is not limited to the foregoing embodiments but may be practiced in still other ways. For example, the invention is also applicable to a thin-film magnetic head dedicated to recording that has an induction-type electromagnetic transducer only, or a thin-film magnetic head that performs recording and reproducing operations with an induction-type electromagnetic transducer.

The etching method of the invention is applicable not only to the etching of magnetic material films for use in a thin-film magnetic head, but also to the etching of magnetic material films for use in other micro devices such as a magnetic thin-film memory.

As has been described, in the method of etching a magnetic material film according to the invention, an etching gas containing a halogen type gas and a carbon compound type gas is excited to generate activated species, so that a magnetic material film is etched by dry etching that includes chemical etching using the activated species. Consequently, according to the invention, it is possible to form a finely-patterned magnetic material film.

In the method of manufacturing a thin-film magnetic head according to the invention, an etching gas containing a halogen type gas and a carbon compound type gas is excited to generate activated species, so that a magnetic material film is etched in part by dry etching that includes chemical etching using the activated species. At least part of the first pole layer or at least part of the second pole layer is thereby patterned. Consequently, according to the invention, it is possible to form a magnetic pole portion of small width with high precision in a thin-film magnetic head by using a high saturation flux density material.

Obviously many modifications and variations of the present invention are possible in the light of the above teachings. It is therefore to be understood that within the scope of the appended claims the invention may be practiced otherwise than as specifically described.

What is claimed is:

1. A method of etching a magnetic material film, comprising the steps of:
    generating activated species by exciting an etching gas containing a halogen type gas and a carbon compound type gas; and
    etching a magnetic material film by dry etching that includes chemical etching using the activated species, wherein
    the magnetic material film is made of a metal magnetic material containing at least iron and cobalt among the group consisting of iron, nickel and cobalt, and
    the carbon compound type gas is selected from the group consisting of $CO_2$, $C_3O_2$, and $C_5O_2$.

2. A method of etching according to claim 1, wherein the dry etching is reactive ion etching.

3. A method of etching according to claim 1, wherein the halogen type gas contains at least either of $Cl_2$ and $BCl_3$.

4. A method of etching according to claim 1, wherein the etching gas further contains $O_2$.

5. A method of etching according to claim 1, wherein the magnetic material film is kept within a range of 50 to 700° C. in temperature in the step of etching.

6. A method of etching according to claim 1, wherein the magnetic material film is kept within a range of 50 to 350° C. in temperature in the step of etching.

7. A method of etching according to claim 1, wherein the magnetic material film is kept within a range of 200 to 300° C. in temperature in the step of etching.

8. A method of etching according to claim 1, further comprising the step of forming an etching mask on the magnetic material film before the step of generating the activated species.

9. A method of etching according to claim 8, wherein the etching mask includes an insulating layer and a metal layer located thereon.

10. A method of etching according to claim 8, wherein the etching mask is made of an insulating material.

11. A method of etching according to claim 10, wherein the insulating material is $Al_2O_3$.

12. A method of etching according to claim 8, wherein the etching mask is made of a metal material.

13. A method of etching according to claim 12, wherein the etching mask is formed by plating.

14. A method of etching according to claim 12, wherein the metal material is a magnetic material different from that constituting the magnetic material film.

15. A method of etching according to claim 14, wherein the metal material contains nickel and iron.

16. A method of etching according to claim 12, wherein the metal material contains nickel.

17. A method of etching a magnetic material film, comprising the steps of:
    generating activated species by exciting an etching gas containing a halogen type gas and a carbon compound type gas;
    etching a magnetic material film by dry etching that includes chemical etching using the activated species; and
    a second etching step to etch at least part of a region having undergone the etching in the step of etching, by different dry etching.

18. A method of etching according to claim 17, wherein:
    the magnetic material film remaining after the etching in the step of etching has sidewalls; and
    the sidewalls are etched in the second etching step.

19. A method of etching according to claim 17, wherein the carbon compound type gas is selected from the group consisting of $CO_2$, $C_3O_2$, and $C_5O_2$.

20. A method of etching according to claim 17, wherein the second etching step uses ion beam etching.

21. A method of etching according to claim 20, wherein, in the ion beam etching, ion beams travel at an angle within a range of 40° to 75° with respect to a direction perpendicular to a top surface of a base of the magnetic material film.

22. A method of etching according to claim 20, wherein, in the ion beam etching, ion beams travel at an angle within a range of 40° to 50° with respect to a direction perpendicular to a top surface of a base of the magnetic material film.

23. A method of manufacturing a thin-film magnetic head comprising:
a medium facing surface that faces toward a recording medium;
first and second pole layers that are magnetically coupled to each other and include magnetic pole portions opposed to each other and located in regions of the pole layers on a side of the medium facing surface;
a gap layer provided between the magnetic pole portions of the first and second pole layers; and
a thin-film coil at least part of which is disposed between the first and second pole layers and insulated from the first and second pole layers, the method comprising the steps of:
forming the first pole layer;
forming the thin-film coil on the first pole layer;
forming the gap layer on the magnetic pole portion of the first pole layer;
forming the second pole layer on the gap layer and the thin-film coil; and
etching a magnetic material film in part, the magnetic material film constituting at least part of the first pole layer or at least part of the second pole layer, so as to pattern the at least part of the first pole layer or the at least part of the second pole layer, wherein
in the step of etching, an etching gas containing a halogen type gas and a carbon compound type gas is excited to generate activated species, so that the magnetic material film is etched in part by dry etching that includes chemical etching using the activated species.

24. A method of manufacturing a thin-film magnetic head according to claim 23, wherein the dry etching is reactive ion etching.

25. A method of manufacturing a thin-film magnetic head according to claim 23, wherein the carbon compound type gas contains a carbon oxide type gas.

26. A method of manufacturing a thin-film magnetic head according to claim 23, wherein the halogen type gas contains at least either of $Cl_2$ and $BCl_3$.

27. A method of manufacturing a thin-film magnetic head according to claim 23, wherein the etching gas further contains $O_2$.

28. A method of manufacturing a thin-film magnetic head according to claim 23, wherein the magnetic material film is kept within a range of 50 to 700° C. in temperature in the step of etching.

29. A method of manufacturing a thin-film magnetic head according to claim 23, wherein the magnetic material film is kept within a range of 50 to 350° C. in temperature in the step of etching.

30. A method of manufacturing a thin-film magnetic head according to claim 23, wherein the magnetic material film is kept within a range of 200 to 300° C. in temperature in the step of etching.

31. A method of manufacturing a thin-film magnetic head according to claim 23, wherein the magnetic material film is made of a metal magnetic material containing at least iron among the group consisting of iron, nickel, and cobalt.

32. A method of manufacturing a thin-film magnetic head according to claim 31, wherein the metal magnetic material contains cobalt.

33. A method of manufacturing a thin-film magnetic head according to claim 23, wherein the magnetic material film constitutes the magnetic pole portion of the first pole layer.

34. A method of manufacturing a thin-film magnetic head according to claim 33, wherein, in the step of etching, the magnetic material film is etched in part by using an etching mask formed on the magnetic material film.

35. A method of manufacturing a thin-film magnetic head according to claim 33, wherein, in the step of etching, the magnetic material film is etched in part by using the gap layer formed on the magnetic material film, and the second pole layer, as masks.

36. A method of manufacturing a thin-film magnetic head according to claim 33, further comprising a second etching step to etch at least part of a region having undergone the etching in the step of etching, by different dry etching.

37. A method of manufacturing a thin-film magnetic head according to claim 36, wherein the second etching step uses ion beam etching.

38. A method of manufacturing a thin-film magnetic head according to claim 36, wherein:
the magnetic material film remaining after the etching in the step of etching has sidewalls; and
the sidewalls are etched in the second etching step.

39. A method of manufacturing a thin-film magnetic head according to claim 23, wherein the magnetic material film constitutes the magnetic pole portion of the second pole layer.

40. A method of manufacturing a thin-film magnetic head according to claim 39, wherein, in the step of etching, the magnetic material film is etched in part by using an etching mask formed on the magnetic material film.

41. A method of manufacturing a thin-film magnetic head according to claim 40, wherein the etching mask is formed by plating.

42. A method of manufacturing a thin-film magnetic head according to claim 39, further comprising a second etching step to etch at least part of a region having undergone the etching in the step of etching, by different dry etching.

43. A method of manufacturing a thin-film magnetic head according to claim 42, wherein the second etching step uses ion beam etching.

44. A method of manufacturing a thin-film magnetic head according to claim 42, wherein:
the magnetic material film remaining after the etching in the step of etching has sidewalls; and
the sidewalls are etched in the second etching step.

45. A method of manufacturing a thin-film magnetic head according to claim 39, further comprising the step of reducing a width of the magnetic pole portion of the second pole layer by etching sidewalls of a portion of the etched magnetic material film, the portion being to make the magnetic pole portion of the second pole layer.

46. A method of manufacturing a thin-film magnetic head according to claim 45, wherein the step of reducing the width uses ion beam etching.

47. A method of manufacturing a thin-film magnetic head according to claim 45, further comprising the step of etching the gap layer by using the magnetic material film as a mask, after the step of reducing the width.

48. A method of manufacturing a thin-film magnetic head according to claim 47, further comprising the step of etching the first magnetic layer in part by using the magnetic material film and the gap layer as masks, after the step of etching the gap layer.

49. A method of manufacturing a thin-film magnetic head according to claim 48, wherein, in the step of etching the first magnetic layer in part, an etching gas containing a halogen type gas and a carbon compound type gas is excited to generate activated species, so that the first magnetic layer is etched in part by dry etching that includes chemical etching using the activated species.

50. A method of manufacturing a thin-film magnetic head according to claim 39, further comprising the step of etching the gap layer by using the etched magnetic material film as a mask.

51. A method of manufacturing a thin-film magnetic head according to claim 50, further comprising the step of etching the first magnetic layer in part by using the magnetic material film and the gap layer as masks, after the step of etching the gap layer.

52. A method of manufacturing a thin-film magnetic head according to claim 51, wherein, in the step of etching the first magnetic layer in part, an etching gas containing a halogen type gas and a carbon compound type gas is excited to generate activated species, so that the first magnetic layer is etched in part by dry etching that includes chemical etching using the activated species.

53. A method of manufacturing a thin-film magnetic head according to claim 51, further comprising the step of reducing widths of the magnetic pole portion of the first pole layer and the magnetic pole portion of the second pole layer after the step of etching the first magnetic layer in part, by etching sidewalls of the magnetic pole portion of the first pole layer, sidewalls of the gap layer, and sidewalls of the magnetic pole portion of the second pole layer.

54. A method of manufacturing a thin-film magnetic head according to claim 53, wherein the step of reducing the widths uses ion beam etching.

55. A method of manufacturing a thin-film magnetic head according to claim 23, wherein:

the second pole layer has a first layer that touches the gap layer, and a second layer located on the first layer;

the magnetic material film constitutes the first layer; and in the step of etching, the magnetic material film is etched in part by using the second layer as a mask, thereby patterning the first layer.

56. A method of manufacturing a thin-film magnetic head according to claim 55, wherein the second layer is formed by plating.

57. A method of manufacturing a thin-film magnetic head according to claim 55, wherein the second layer is made of a magnetic material different from that constituting the magnetic material film.

\* \* \* \* \*

UNITED STATES PATENT AND TRADEMARK OFFICE
CERTIFICATE OF CORRECTION

PATENT NO. : 6,884,730 B2
DATED : April 26, 2005
INVENTOR(S) : Yoshitaka Sasaki, Hironori Araki and Takehiro Kamigama It is certified that error appears in the above-identified patent and that said Letters Patent is hereby corrected as shown below:

Column 7,
Line 46, change "magnetic" to -- pole --.

Column 10,
Line 4, change "553B" to -- 55B --.

Column 19,
Line 6, delete "113.".

Column 33,
Line 19, change "coil on" to -- coil over --.

Column 34,
Line 60, change "magnetic layer" to -- pole layer --.
Lines 65 and 67, change "magnetic" to -- pole --.

Column 35,
Lines 14, 16 and 23, change "magnetic" to -- pole --.

Signed and Sealed this

Sixteenth Day of August, 2005

JON W. DUDAS
*Director of the United States Patent and Trademark Office*